US008234262B2

United States Patent
Jung et al.

(10) Patent No.: US 8,234,262 B2
(45) Date of Patent: *Jul. 31, 2012

(54) METHOD OF SELECTING A SECOND CONTENT BASED ON A USER'S REACTION TO A FIRST CONTENT OF AT LEAST TWO INSTANCES OF DISPLAYED CONTENT

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/980,321

(22) Filed: Oct. 29, 2007

(65) Prior Publication Data

US 2009/0112813 A1    Apr. 30, 2009

Related U.S. Application Data

(63) Continuation-in-part of application No. 11/977,752, filed on Oct. 24, 2007, and a continuation-in-part of application No. 11/977,748, filed on Oct. 25, 2007, and a continuation-in-part of application No. 11/978,206, filed on Oct. 26, 2007, and a continuation-in-part of application No. 11/978,534, filed on Oct. 27, 2007.

(51) Int. Cl.
*G06F 17/30* (2006.01)
*H04W 24/00* (2009.01)

(52) U.S. Cl. .................................. 707/706; 455/456.1
(58) Field of Classification Search .................. None
See application file for complete search history.

(56) References Cited

U.S. PATENT DOCUMENTS

| 6,118,888 | A | 9/2000 | Chino et al. |
| 6,401,050 | B1 | 6/2002 | Cooke et al. |
| 6,606,605 | B1 | 8/2003 | Kolls |
| 6,651,045 | B1 | 11/2003 | Macaulay |
| 6,687,608 | B2 | 2/2004 | Sugimoto et al. |
| 6,708,176 | B2 | 3/2004 | Strunk et al. |

(Continued)

FOREIGN PATENT DOCUMENTS
WO    WO 2007/088536 A2    8/2007

OTHER PUBLICATIONS

U.S. Appl. No. 11/981,573, Jung et al.

(Continued)

*Primary Examiner* — Tarek Chbouki

(57) ABSTRACT

Embodiments provide a device, a system, a computer program product, and a method. A provided method embodiment may be implemented in an environment that includes a person viewing at least two instances of content having a common contextual attribute and displayed by an electronic device. The method includes detecting a reaction by a person to a displayed first content of the at least two instances of displayed content having a common contextual attribute. The method also includes determining a content attribute of the displayed first content. The method further includes initiating a search for a second content using a search parameter corresponding to the detected reaction and to the determined content attribute.

47 Claims, 28 Drawing Sheets

U.S. PATENT DOCUMENTS

| | | |
|---|---|---|
| 6,807,532 B1 | 10/2004 | Kolls |
| 6,807,675 B1 | 10/2004 | Maillard et al. |
| 6,847,992 B1 | 1/2005 | Haitsuka et al. |
| 6,873,314 B1 | 3/2005 | Campbell |
| 6,968,334 B2 | 11/2005 | Salmenkaita et al. |
| 7,010,497 B1 | 3/2006 | Nyhan et al. |
| 7,100,818 B2 | 9/2006 | Swaine |
| 7,197,472 B2 | 3/2007 | Conkwright et al. |
| 7,225,142 B1 | 5/2007 | Apte et al. |
| 7,228,327 B2 | 6/2007 | Shuster |
| 7,356,547 B2 | 4/2008 | Ozer et al. |
| 7,363,282 B2 | 4/2008 | Karnawat et al. |
| 7,418,405 B1 | 8/2008 | Utter et al. |
| 7,472,102 B1 | 12/2008 | Heckerman et al. |
| 7,495,659 B2 | 2/2009 | Marriott et al. |
| 7,555,287 B1 | 6/2009 | Heinonen et al. |
| 7,562,064 B1 | 7/2009 | Chickering et al. |
| 7,590,619 B2 | 9/2009 | Hurst-Hiller et al. |
| 7,590,723 B2 | 9/2009 | Mager et al. |
| 7,599,918 B2 | 10/2009 | Shen et al. |
| 7,636,672 B2 | 12/2009 | Angles et al. |
| 7,679,579 B2 | 3/2010 | Minatogawa |
| 7,689,672 B2 | 3/2010 | Kanojia et al. |
| 7,702,318 B2 | 4/2010 | Ramer et al. |
| 7,703,114 B2 | 4/2010 | Thukral |
| 7,703,611 B1 | 4/2010 | Appelman et al. |
| 7,764,311 B2 | 7/2010 | Bill |
| 7,769,632 B2 | 8/2010 | Giraud et al. |
| 7,769,764 B2 | 8/2010 | Ramer et al. |
| 7,779,436 B1 | 8/2010 | Kamen et al. |
| 7,836,481 B1 | 11/2010 | Hendricks |
| 7,844,488 B2 | 11/2010 | Merriman et al. |
| 7,865,404 B2 | 1/2011 | Peckover |
| 7,904,439 B2 | 3/2011 | Horvitz et al. |
| 7,907,940 B2 | 3/2011 | Ramer et al. |
| 7,908,150 B2 | 3/2011 | Rochet |
| 2001/0044751 A1 | 11/2001 | Pugliese, III et al. |
| 2002/0030163 A1 | 3/2002 | Zhang |
| 2002/0059370 A1 | 5/2002 | Shuster |
| 2002/0072952 A1 | 6/2002 | Hamzy et al. |
| 2002/0112035 A1 | 8/2002 | Carey et al. |
| 2002/0127623 A1 | 9/2002 | Minshull et al. |
| 2002/0130898 A1 | 9/2002 | Ogawa et al. |
| 2002/0139842 A1 | 10/2002 | Swaine |
| 2002/0184098 A1 | 12/2002 | Giraud et al. |
| 2003/0060728 A1 | 3/2003 | Mandigo |
| 2003/0078840 A1 | 4/2003 | Strunk et al. |
| 2003/0088463 A1 | 5/2003 | Kanevsky et al. |
| 2003/0220835 A1 | 11/2003 | Barnes, Jr. |
| 2003/0236582 A1 | 12/2003 | Zamir et al. |
| 2004/0148572 A1* | 7/2004 | Nakanishi et al. ............ 715/517 |
| 2004/0152957 A1* | 8/2004 | Stivoric et al. ............... 600/300 |
| 2004/0193488 A1* | 9/2004 | Khoo et al. .................... 705/14 |
| 2005/0013104 A1 | 1/2005 | Feague et al. |
| 2005/0021677 A1 | 1/2005 | Musha et al. |
| 2005/0108092 A1 | 5/2005 | Campbell et al. |
| 2005/0157377 A1 | 7/2005 | Goldman et al. |
| 2005/0172319 A1 | 8/2005 | Reichardt et al. |
| 2005/0235338 A1* | 10/2005 | AbiEzzi et al. ............... 725/142 |
| 2006/0074883 A1 | 4/2006 | Teevan et al. |
| 2006/0085818 A1* | 4/2006 | Bodlaender et al. ........... 725/46 |
| 2006/0129457 A1 | 6/2006 | Nyhan et al. |
| 2006/0133586 A1 | 6/2006 | Kasai et al. |
| 2006/0143647 A1 | 6/2006 | Bill |
| 2006/0179044 A1 | 8/2006 | Rosenberg |
| 2006/0195441 A1* | 8/2006 | Julia et al. ........................ 707/5 |
| 2007/0061753 A1 | 3/2007 | Ng et al. |
| 2007/0066323 A1 | 3/2007 | Park et al. |
| 2007/0168413 A1 | 7/2007 | Barletta et al. |
| 2007/0208719 A1 | 9/2007 | Tran |
| 2007/0214471 A1* | 9/2007 | Rosenberg ...................... 725/24 |
| 2007/0220010 A1* | 9/2007 | Ertugrul ......................... 707/10 |
| 2007/0220040 A1* | 9/2007 | Do ................................ 707/102 |
| 2007/0265090 A1 | 11/2007 | Barsness et al. |
| 2007/0287415 A1* | 12/2007 | Yamada ......................... 455/406 |
| 2007/0293731 A1 | 12/2007 | Downs et al. |
| 2007/0294064 A1 | 12/2007 | Shuster |
| 2008/0004989 A1* | 1/2008 | Yi ..................................... 705/27 |
| 2008/0052219 A1* | 2/2008 | Sandholm et al. .............. 705/37 |
| 2008/0065468 A1 | 3/2008 | Berg et al. |
| 2008/0114756 A1 | 5/2008 | Konig et al. |
| 2008/0146892 A1 | 6/2008 | LeBoeuf et al. |
| 2008/0275700 A1 | 11/2008 | Bingley et al. |
| 2008/0306913 A1* | 12/2008 | Newman et al. .................. 707/3 |
| 2008/0313033 A1 | 12/2008 | Guo et al. |
| 2009/0018911 A1 | 1/2009 | An Chang et al. |
| 2009/0030978 A1* | 1/2009 | Johnson et al. ............... 709/203 |
| 2009/0076887 A1* | 3/2009 | Spivack et al. ................. 705/10 |
| 2009/0089678 A1* | 4/2009 | Sacco et al. ................... 715/733 |
| 2009/0112656 A1 | 4/2009 | Jung et al. |
| 2009/0112693 A1 | 4/2009 | Jung et al. |
| 2009/0112695 A1 | 4/2009 | Jung et al. |
| 2009/0112696 A1 | 4/2009 | Jung et al. |
| 2009/0112713 A1 | 4/2009 | Jung et al. |
| 2009/0132368 A1* | 5/2009 | Cotter et al. .................... 705/14 |
| 2009/0138565 A1* | 5/2009 | Shiff et al. .................... 709/206 |
| 2009/0150363 A1 | 6/2009 | Gross et al. |
| 2009/0216744 A1* | 8/2009 | Shriwas et al. .................. 707/5 |
| 2010/0122178 A1 | 5/2010 | Konig et al. |
| 2010/0174586 A1* | 7/2010 | Berg et al. ...................... 705/10 |
| 2010/0250513 A1 | 9/2010 | Guha |

OTHER PUBLICATIONS

U.S. Appl. No. 11/983,406, Jung et al.
U.S. Appl. No. 11/998,779, Jung et al.
U.S. Appl. No. 11/998,826, Jung et al.
U.S. Appl. No. 11/998,820, Jung et al.
U.S. Appl. No. 12/001,759, Jung et al.
U.S. Appl. No. 12/006,792, Jung et al.
U.S. Appl. No. 12/006,793, Jung et al.
U.S. Appl. No. 12/011,031, Jung et al.
"Eye Gaze Tracking"; ISL eye gaze tracking; pp. 1-3; printed on Sep. 19, 2007; located at http://www.is.cs.cmu.edu/mie/eyegaze.html.
"Eye tracking"; Wikipedia.com; bearing dates of Dec. 2006 and Sep. 13, 2007; pp. 1-5; Wikimedia Foundation, Inc.; USA; printed on Sep. 19, 2007; located at http://en.wikipedia.org/wiki/Eye_tracking.
"Happy, sad, angry or astonished?"; Physorg.com; Jul. 3, 2007; pp. 1-2; Physorg.com; printed on Sep. 19, 2007; located at http://www.physorg.com/news102696772.html.
Kim, Kyung-Nam; Ramakrishna, R.S.; "Vision-Based Eye-Gaze Tracking for Human Computer Interface"; IEEE; 1999; pp. 324-329; IEEE.
Mao, Xiaoyang, et al.; "Gaze-Directed Flow Visualization"; Proc. of SPIE-IS&T Electronic Imaging; bearing a date of 2004; pp. 141-150; vol. 5295; SPIE and IS&T.
"MyTobii 2.3 means new power to communicate"; tobii.com; bearing a date of 2006; p. 1; Tobii Technology AB; printed on Sep. 19, 2007; located at http://www.tobii.com//default.asp?sid=1220.
MyTobii User Manual, Version 2.3; tobii.com; bearing dates of Apr. 2007 and 2006; pp. 1-86; Tobii Technology AB.
Ohshima, Toshikazu et al.; "Gaze-directed Adaptive Rendering for Interacting with Virtual Space" (abstract only); Proceedings of the 1996 Virtual Reality Annual International Symposium (VRAIS 96); 1996; p. 103 (pp. 1-3 provided); ISBN:0-8186-7295-1; IEEE Computer Society; Washington, DC; USA; printed on Oct. 2, 2007; located at http://portal.acm.org/citation.cfm?id=836033&coll=Portal&dl=GUIDE&CFID=1534099&CFTOKEN=93189133.
Arapakis et al.; "Using Facial Expressions and Peripheral Physiological Signals as Implicit Indicators of Topical Relevance"; proceedings of the 17th ACM International Conference on Multimedia; Oct. 19-24, 2009; pp. 461- 470; ACM.
Kelly et al.; "Biometric Response as a Source of Query Independent Scoring in Lifelog Retrieval"; Lecture Notes in Computer Science; 2010; pp. 520-531; vol. 5993; Springer-Verlag Berlin Heidelberg.

* cited by examiner

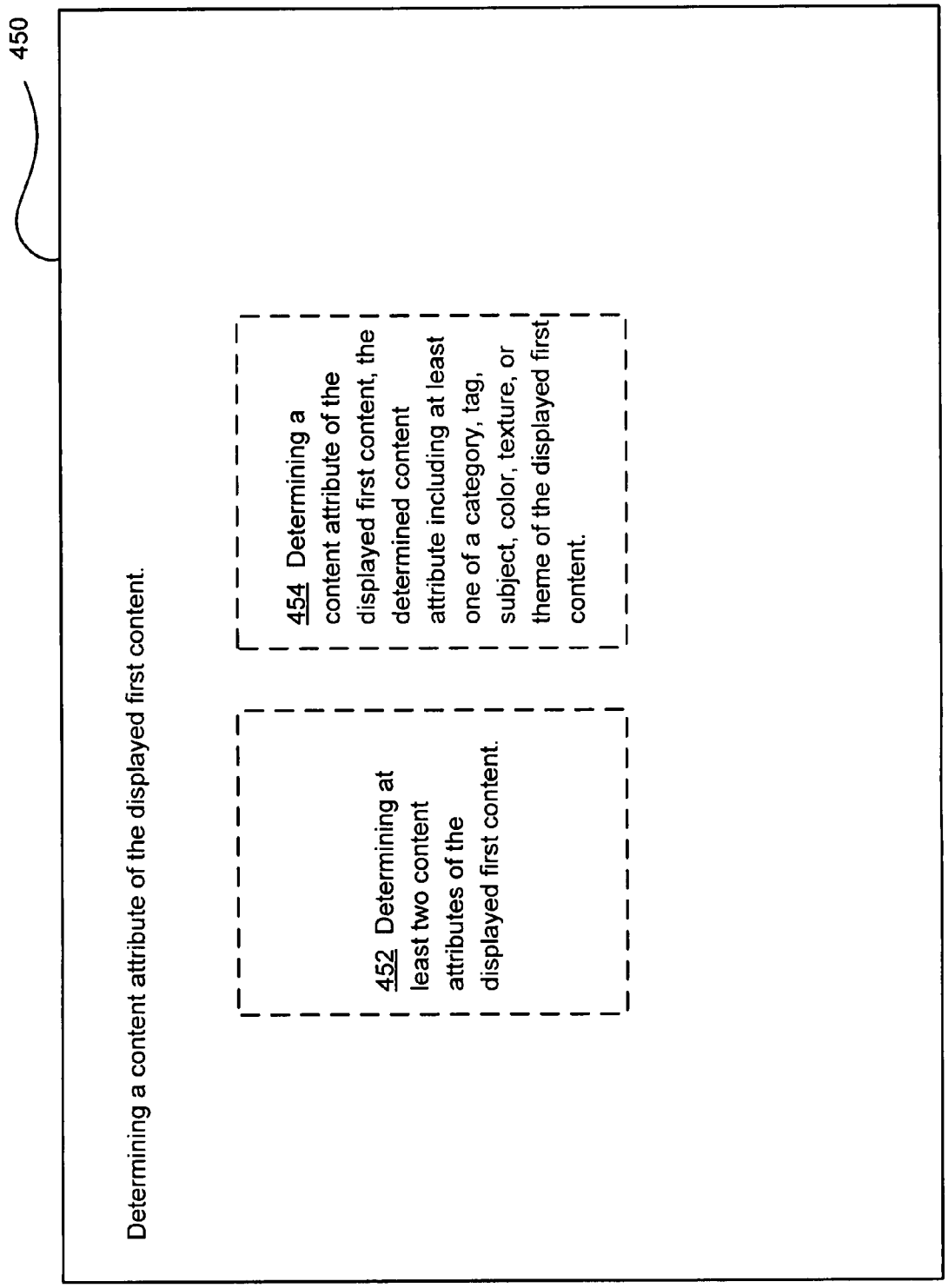

FIG. 9

460 — Facilitating a search for a second content based on the detected reaction and on the determined content attribute.

462 Searching a local data store for a second content based on the detected reaction and on the determined content attribute.

464 Facilitating a search by a search engine for a second content based on the detected reaction and on the determined content attribute.

466 Facilitating a search by a Web search engine for a second content based on the detected reaction and on the determined content attribute.

468 Facilitating a search by a search algorithm responsive to the detected reaction and on the determined content attribute.

472 Facilitating a search for at least two instances of a second content based on the detected reaction and on the determined content attribute.

474 Facilitating a search for a second content based on at least one of a positive correlation, or a negative correlation between the detected reaction and on the determined content attribute.

610 Computer-readable storage medium bearing the program instructions.

620 Program instructions operable to perform a process in a computing device, the process comprising:

detect a reaction by a person to a displayed first content;

determine a content attribute of the displayed first content;

facilitate a search for a second content based on the detected reaction and on the determined content attribute;

select the second content from a result of the facilitated search; and save data indicative of the selected second content.

622 Facilitating a display of the selected second content.

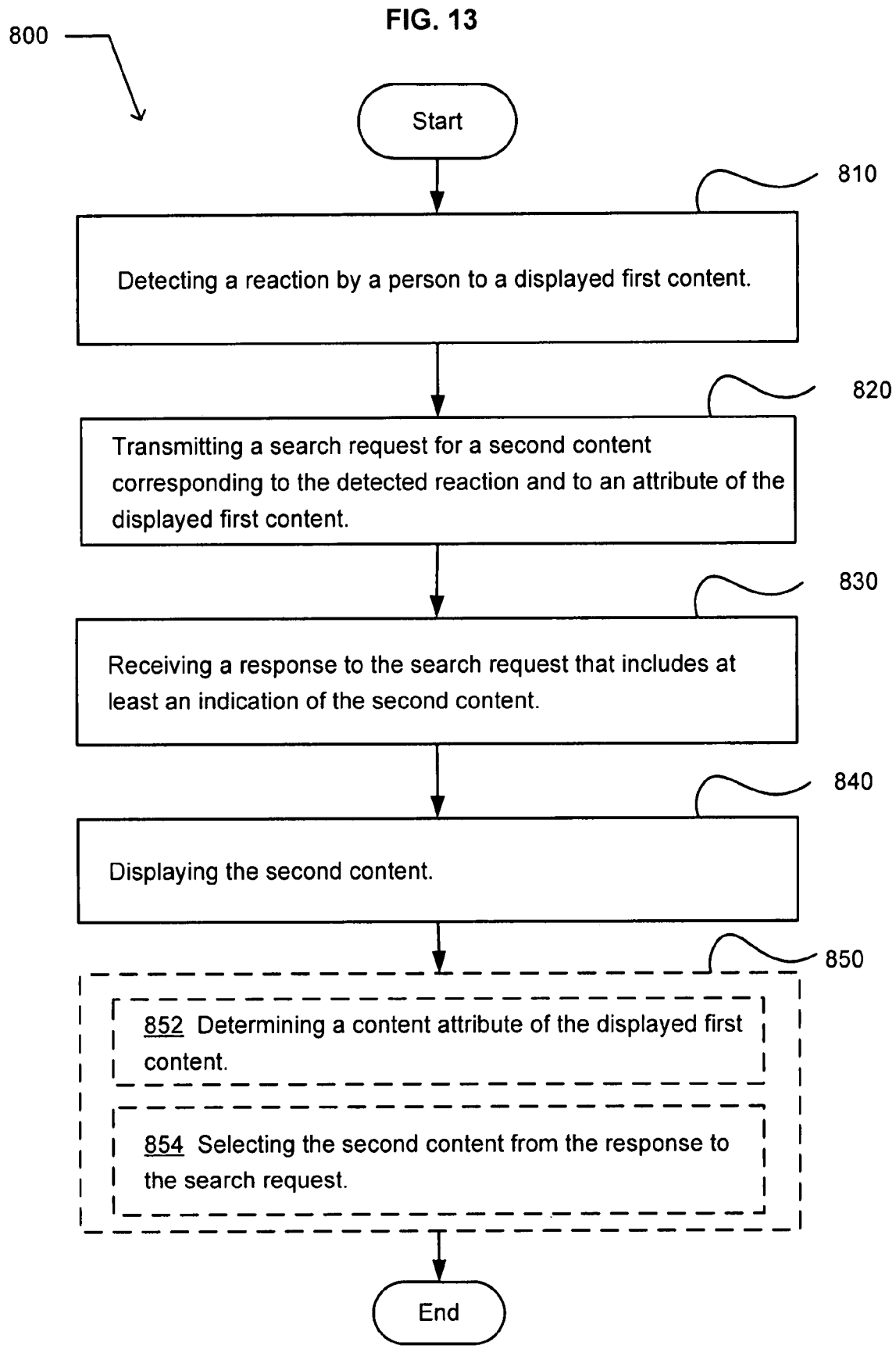

862 Computer-readable storage medium bearing the program instructions.

864 Program instructions operable to perform a process in a computing device, the process comprising:
  detect a reaction by a person to a displayed first content;
  transmit a search request for a second content corresponding to the detected reaction and to an attribute of the displayed first content;
  receive a response to the search request that includes at least an indication of the second content;
  save data indicative of the received response to the search request; and
  display the second content.

866 Select the second electronic content from the received response to the search request.

1210 Computer-readable medium bearing the program instructions.

1220 Program instructions operable to perform a process in a computing device, the process comprising:

receive sensor data from a requestor indicative of a response by a person to a viewed first content;

analyze the received sensor data for an indication of an expression by the person corresponding to the viewed first content;

facilitate a search of an index for a second content using a search parameter corresponding to the indicated expression and a content attribute of the viewed first content; and return to the requestor an indication of the second content.

1222 Select the second content from a result of the search for a second content.

1224 Save data indicative of the selected second content.

1212 Computer storage medium.

1305 Electronic device.

1310 Means for receiving data from a requestor indicative of a sensed response by a person to a first content displayed to the person.

1320 Means for analyzing the received data for an indication of an expression by the person corresponding to the first content.

1330 Means for facilitating a search for a second content using a search parameter corresponding to the indication of an expression by the person and a content attribute of the displayed first content.

1340 Means for returning to the requestor an indication of the second content.

1350 Means for receiving an indication of a content attribute of the displayed first content.

1360 Means for determining a content attribute of the displayed first content.

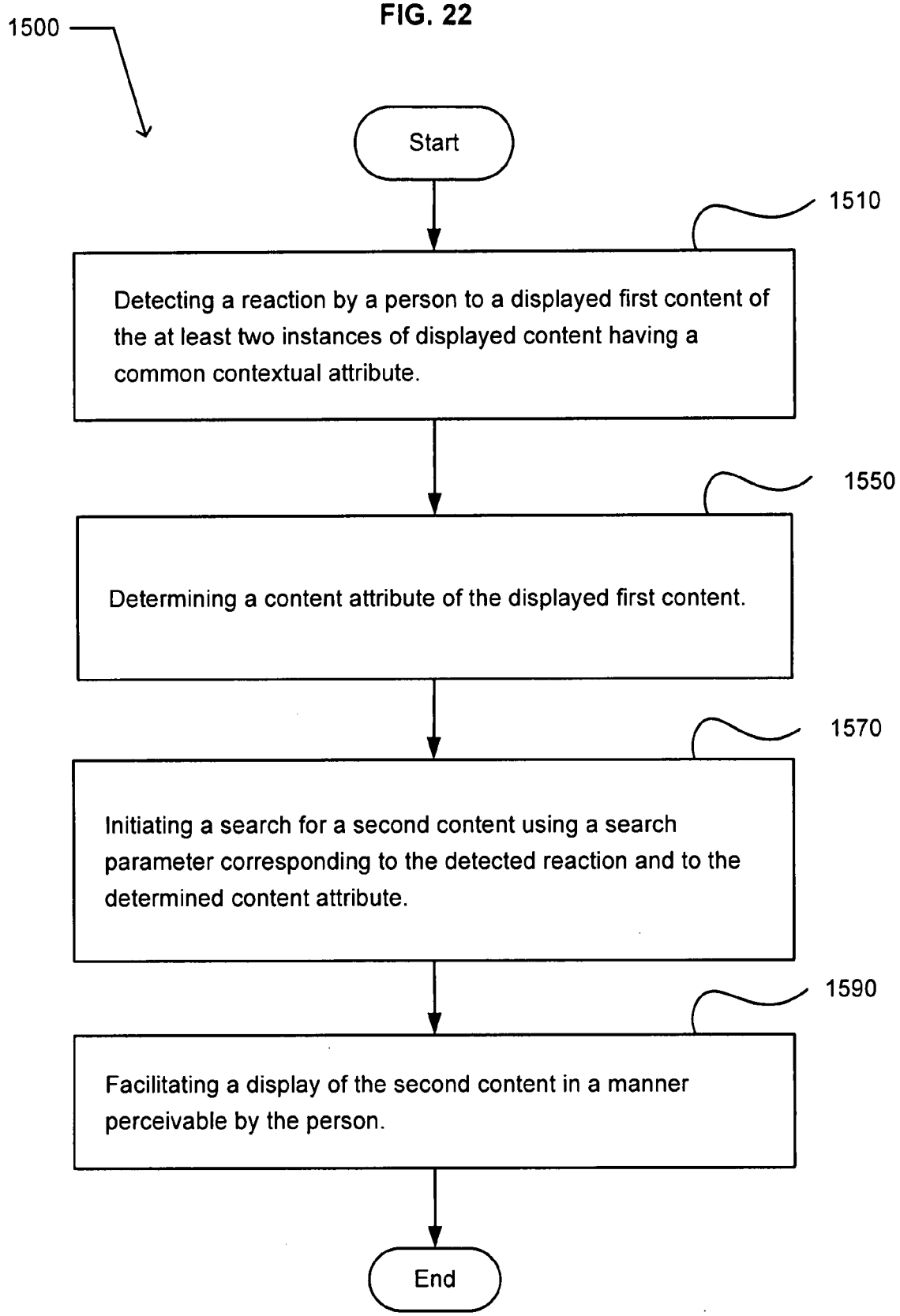

```
Start
  ↓
```

1510 — Detecting a reaction by a person to a displayed first content of the at least two instances of displayed content having a common contextual attribute.

1550 — Determining a content attribute of the displayed first content.

1570 — Initiating a search for a second content using a search parameter corresponding to the detected reaction and to the determined content attribute.

1590 — Facilitating a display of the second content in a manner perceivable by the person.

1610 — At least one additional operation.

End

Detecting a reaction by a person to a displayed first content of the at least two instances of displayed content having a common contextual attribute.

1512 At least one of sensing, identifying, or recognizing a reaction by a person to a displayed content of the at least two instances of displayed content having a common contextual attribute.

1516 Sensing a gaze by a person at a displayed first content of the at least two instances of displayed content and detecting a reaction by a person to the displayed first content.

1522 Detecting a physiological response by a person to a displayed first content of the at least two instances of displayed content having a common contextual attribute.

1514 Detecting at least one of a positive or negative reaction by a person to a displayed first content of the at least two instances of displayed content having a common contextual attribute.

1518 Detecting a physiological reaction by a person to a displayed first content of the at least two instances of displayed content having a common contextual attribute.

1524 Detecting a reaction by a person to a displayed first content of the at least two instances of displayed content having a common contextual attribute, the common contextual attribute including the at least two instances of displayed content having been returned in response to a search request.

Initiating a search for a second content using a search parameter corresponding to the detected reaction and to the determined content attribute.

1572 Initiating a search for a second content using a search parameter corresponding to the detected reaction, to the determined content attribute, and to the common contextual attribute.

1574 Initiating a search of a local data store using a search parameter corresponding to the detected reaction and to the determined content attribute.

1576 Initiating a search by a search engine for a second content using a search parameter corresponding to the detected reaction and to the determined content attribute.

1578 Initiating a search by a third-party search engine for a second content using a search parameter corresponding to the detected reaction and to the determined content attribute.

1582 Initiating a search for a second content using a search algorithm responsive to the detected reaction and to the determined content attribute.

1584 Initiating a search for at least two instances of a second content using a search parameter corresponding to the detected reaction and to the determined content attribute.

1586 Initiating a search for a second content based on at least one of a positive correlation, or a negative correlation between the detected reaction and the determined content attribute.

1588 Initiating a search for a second content using a search parameter corresponding to the detected reaction and a determined content attribute of the at least two instances of displayed content.

METHOD OF SELECTING A SECOND CONTENT BASED ON A USER'S REACTION TO A FIRST CONTENT OF AT LEAST TWO INSTANCES OF DISPLAYED CONTENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/977,752, entitled METHOD OF SELECTING A SECOND CONTENT BASED ON A USER'S REACTION TO A FIRST CONTENT, naming EDWARD K.Y. JUNG; ROYCE A. LEVIEN; ROBERT W. LORD; MARK A. MALAMUD; JOHN D. RINALDO, JR. as inventors, filed 24, OCT., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/977,748, entitled REQUESTING A SECOND CONTENT BASED ON A USER'S REACTION TO A FIRST CONTENT, naming EDWARD K.Y. JUNG; ROYCE A. LEVIEN; ROBERT W. LORD; MARK A. MALAMUD; JOHN D. RINALDO, JR. as inventors, filed 25, OCT., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/978,206, entitled SELECTING A SECOND CONTENT BASED ON A USER'S REACTION TO A FIRST CONTENT, naming EDWARD K.Y. JUNG; ROYCE A. LEVIEN; ROBERT W. LORD; MARK A. MALAMUD; JOHN D. RINALDO, JR. as inventors, filed 26, OCT., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/978,534, entitled RETURNING A SECOND CONTENT BASED ON A USER'S REACTION TO A FIRST CONTENT, naming EDWARD K.Y. JUNG; ROYCE A. LEVIEN; ROBERT W. LORD; MARK A. MALAMUD; JOHN D. RINALDO, JR. as inventors, filed 27, OCT., 2007, which is currently co-pending, or is an application of which a currently co-pending application is entitled to the benefit of the filing date.

The U.S. Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/pat-bene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides method implemented in an environment that includes a person viewing content displayed by an electronic device. The method includes detecting a reaction by the person to a displayed first content. The method also includes determining a content attribute of the displayed first content. The method further includes facilitating a search for a second content based on the detected reaction and on the determined content attribute. The method includes displaying the second content in a manner perceivable by the person. The method may include displaying the first content in a manner perceivable by the person. The method may include selecting the second content from a result of the facilitated search. The method may further include maintaining informational data corresponding to the second content. In addition to the foregoing, other method embodiments are described in the claims, drawings, and text that form a part of the present application.

Another embodiment provides a system. The system includes a display surface operable to display electronic content in a manner perceivable by a person. The system also includes a sensor apparatus operable to acquire data indicative of a response by the person to a first electronic content displayed on the surface. The system further includes an analytic circuit operable determine an indication of an expression by the person corresponding with the displayed first electronic content. The determination is based on the data indicative of a response. The system also includes a characterization circuit operable to determine an attribute of the displayed first electronic content. The system includes a query circuit operable to cause a search for a second electronic content corresponding to the indication of expression and to the attribute of the first electronic content. The system further includes a chooser circuit operable to select the second electronic content from a result of the search. The system may include a digital storage device operable to save the selected second electronic content. The system may include a broadcast circuit operable to facilitate a display of the first electronic content and the selected second electronic content. The system may further include a receiver circuit operable to receive a result of the initiated search. In addition to the foregoing, other system embodiments are described in the claims, drawings, and text that form a part of the present application.

A further embodiment provides a computer program product. The computer program product includes a computer-readable computer storage medium bearing the program instructions. The computer program product also includes the program instructions which are operable to perform a process in a computing device. The process includes detect a reaction by a person to a displayed first content. The process also includes determine a content attribute of the displayed first content. The process further includes facilitate a search for a second content based on the detected reaction and on the determined content attribute. The process also includes select the second content from a result of the facilitated search. The process further includes save data indicative of the selected second content. In addition to the foregoing, other computer program embodiments are described in the claims, drawings, and text that form a part of the present application.

An embodiment provides an electronic device. The electronic device includes means for detecting a reaction by a person to a displayed first content. The electronic device also includes means for determining a content attribute of the displayed first content. The electronic device further includes means for facilitating a search for a second content based on the detected reaction and on the determined content attribute. The electronic device also includes means for displaying the second content in a manner perceivable by the person. In addition to the foregoing, other electronic device embodiments are described in the claims, drawings, and text that form a part of the present application.

Another embodiment provides a method implemented in an environment that includes a person viewing content displayed by an electronic device. The method includes detecting a reaction by the person to a displayed first content. The method also includes transmitting a search request for a second content corresponding to the detected reaction and to an attribute of the displayed first content. The method further includes receiving a response to the search request that includes at least an indication of the second content. The method also includes displaying the second content. In an alternative embodiment, the method may include determining a content attribute of the displayed first content. The method may include selecting the second content from the response to the search request. In addition to the foregoing, other method embodiments are described in the claims, drawings, and text that form a part of the present application.

A further embodiment provides an electronic device. The electronic device includes a display surface, a sensor apparatus, an analytic circuit, a query circuit, and a receiver circuit. The display surface is operable to display electronic content in a manner perceivable by a person. The sensor apparatus is operable to acquire data indicative of a response by the person to a first electronic content displayed on the surface. The analytic circuit is operable to detect a reaction by the person to a displayed first content in response to the acquired data. The query circuit is operable to transmit a search request for a second electronic content that corresponds to the detected reaction and to an attribute of the displayed first content. The receiver circuit is operable to receive a response to the search request that includes at least an indication of the second content. In an alternative embodiment, the electronic device may include a chooser circuit operable to select the second electronic content from the received response to the search request. The electronic device may include a broadcast circuit operable to facilitate a display of the first electronic content and the second electronic content. The electronic device may include a receiver circuit operable to receive a result of the initiated search. The electronic device may include a digital storage device operable to save the received response to the search request. In addition to the foregoing, other electronic device embodiments are described in the claims, drawings, and text that form a part of the present application.

An embodiment provides a computer program product. The computer program product includes a computer-readable computer storage medium bearing program instructions. The program instructions are operable to perform a process in a computing device. The process includes detect a reaction by a person to a displayed first content. The process also includes transmit a search request for a second content corresponding to the detected reaction and to an attribute of the displayed first content. The process further includes receive a response to the search request that includes at least an indication of the second content. The process also includes save data indicative of the received response to the search request. The process further includes display the second content. In addition to the foregoing, other computer program product embodiments are described in the claims, drawings, and text that form a part of the present application.

Another embodiment provides a method. The method includes receiving from a requestor sensor data indicative of a response by a person to a first content displayed to the person. The method also includes analyzing the received sensor data for an indication of an expression by the person corresponding to the first content. The method further includes facilitating a search for a second content using a search parameter corresponding to the indication of an expression by the person and to a content attribute of the displayed first content. The method also includes returning to the requestor an indication of the second content. The method may include determining a content attribute of the displayed first content. In addition to the foregoing, other method embodiments are described in the claims, drawings, and text that form a part of the present application.

A further embodiment provides an electronic device. The electronic device includes a processing circuit, a query circuit, a chooser circuit, and a storage device. The processing circuit is operable to analyze received sensor data for an indication of an expression by a person corresponding to a first displayed electronic content. The query circuit is operable to cause a search for a second electronic content based on the indication of expression and on an attribute of the displayed first electronic content. The chooser circuit is operable to select the second electronic content from a result of the search for a second electronic content. The storage device is operable to save an indication of the selected second electronic content. The electronic device may include a characterization circuit operable to determine the attribute of the displayed first electronic content. The electronic device may include a transmitter circuit operable to send an indication of the selected second electronic content addressed to the requester. The electronic device may include a receiver circuit operable to receive from a requestor sensor data acquired from the person and indicative of a response by the person to a display of a first electronic content. In addition to the foregoing, other device embodiments are described in the claims, drawings, and text that form a part of the present application.

An embodiment provides a computer program product. The computer program product includes a computer-readable medium bearing program instructions. The program instructions are operable to perform a process in a computing device. The process including receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requester an indication of the second content. The computer-readable medium may include a computer storage medium. In addition to the foregoing, other computer program embodiments are described in the claims, drawings, and text that form a part of the present application.

Another embodiment provides an electronic device. The electronic device includes means for receiving data from a requester indicative of a sensed response by a person to a first content displayed to the person. The electronic device also includes means for analyzing the received data for an indication of an expression by the person corresponding to the first content. The electronic device further includes means for facilitating a search for a second content using a search parameter corresponding to the indication of an expression by the person and to a content attribute of the displayed first content. The electronic device also includes means for returning to the requestor an indication of the second content.

A further embodiment provides a method implemented in an environment that includes a person viewing at least two instances of content having a common contextual attribute and displayed by an electronic device. The method includes detecting a reaction by a person to a displayed first content of the at least two instances of displayed content having a common contextual attribute. The method also includes determining a content attribute of the displayed first content. The method further includes initiating a search for a second content using a search parameter corresponding to the detected reaction and to the determined content attribute. The method may also include facilitating a display of the second content in a manner perceivable by the person. The method may include displaying the at least two instances of displayed content in a manner perceivable by the person. The method may include sensing a reaction by the person to the displayed first content of the at least two instances of displayed content having a common contextual attribute. The method may include selecting the second content from a result of the initiated search. The method may include providing an access to the selected second content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 illustrates an alternative embodiment of the operational flow of FIG. 4;

FIG. 9 illustrates another alternative embodiment of the operational flow of FIG. 4;

FIG. 11 illustrates an example computer program product;

FIG. 13 illustrates an example operational flow implemented in an environment that includes a person viewing content displayed by an electronic device;

FIG. 14 illustrates an example computer program product;

FIG. 19 illustrates an example computer program product;

FIG. 20 illustrates an example system that includes an electronic device;

FIG. 22 illustrates an example operational flow implemented in an environment that includes a person viewing at least two instances of content having a common contextual attribute and displayed by an electronic device;

FIGS. 23 and 24 illustrate an alternative embodiment of the operational flow of FIG. 22;

FIG. 25 illustrates a further alternative embodiment of the operational flow of FIG. 22;

FIG. 28 illustrates another alternative embodiment of the operational flow of FIG. 22.

DETAILED DESCRIPTION

Figure 1:
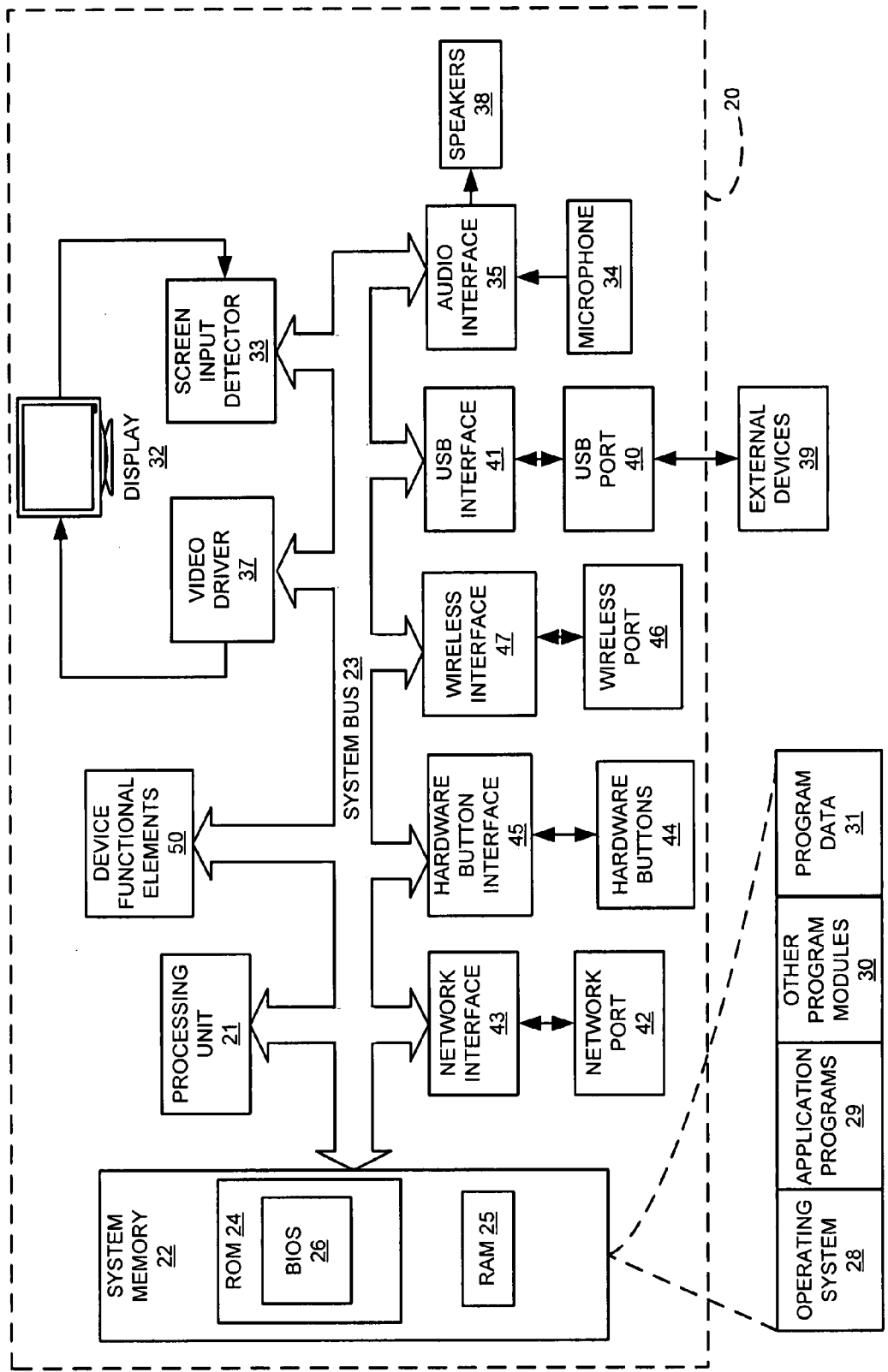
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
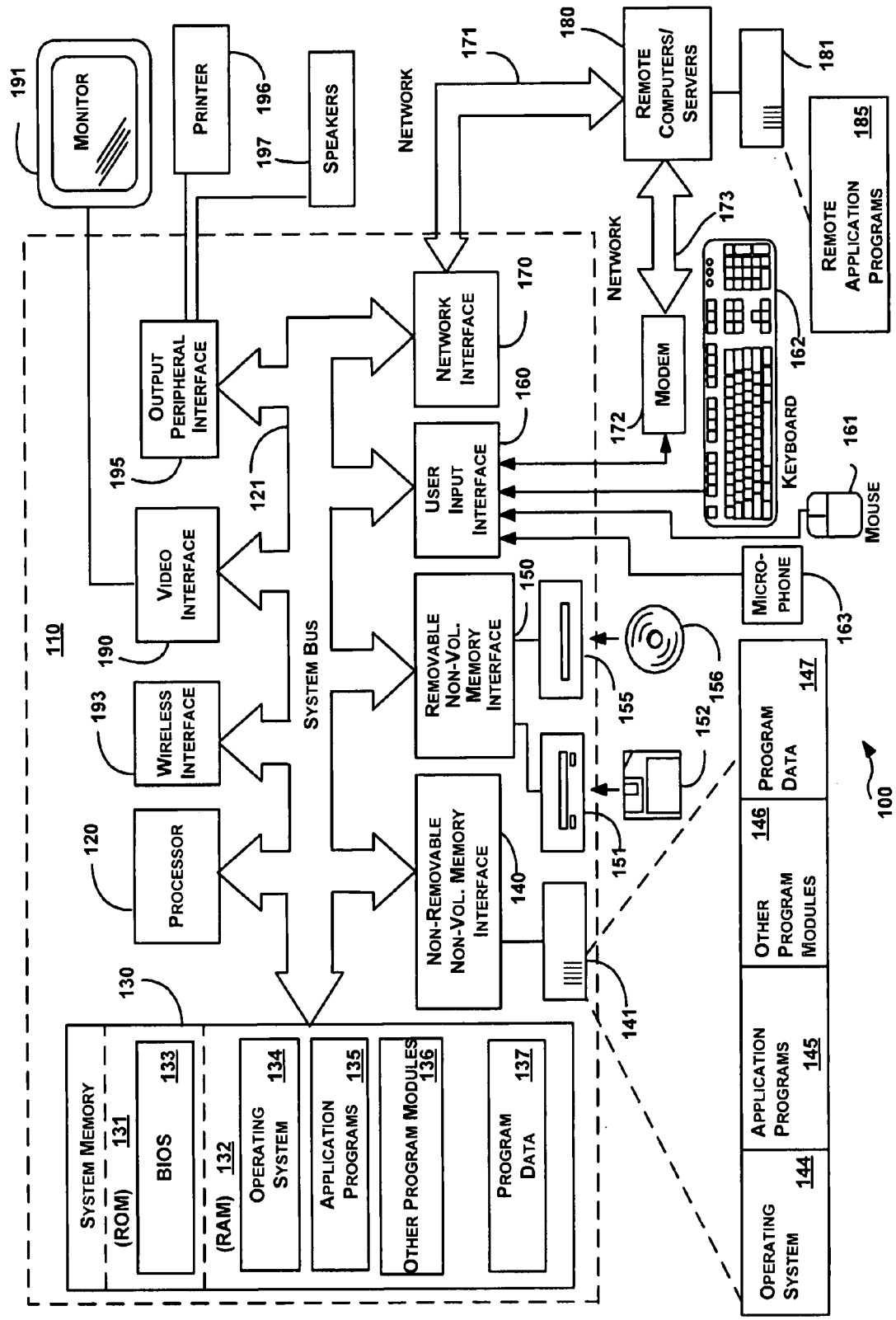
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
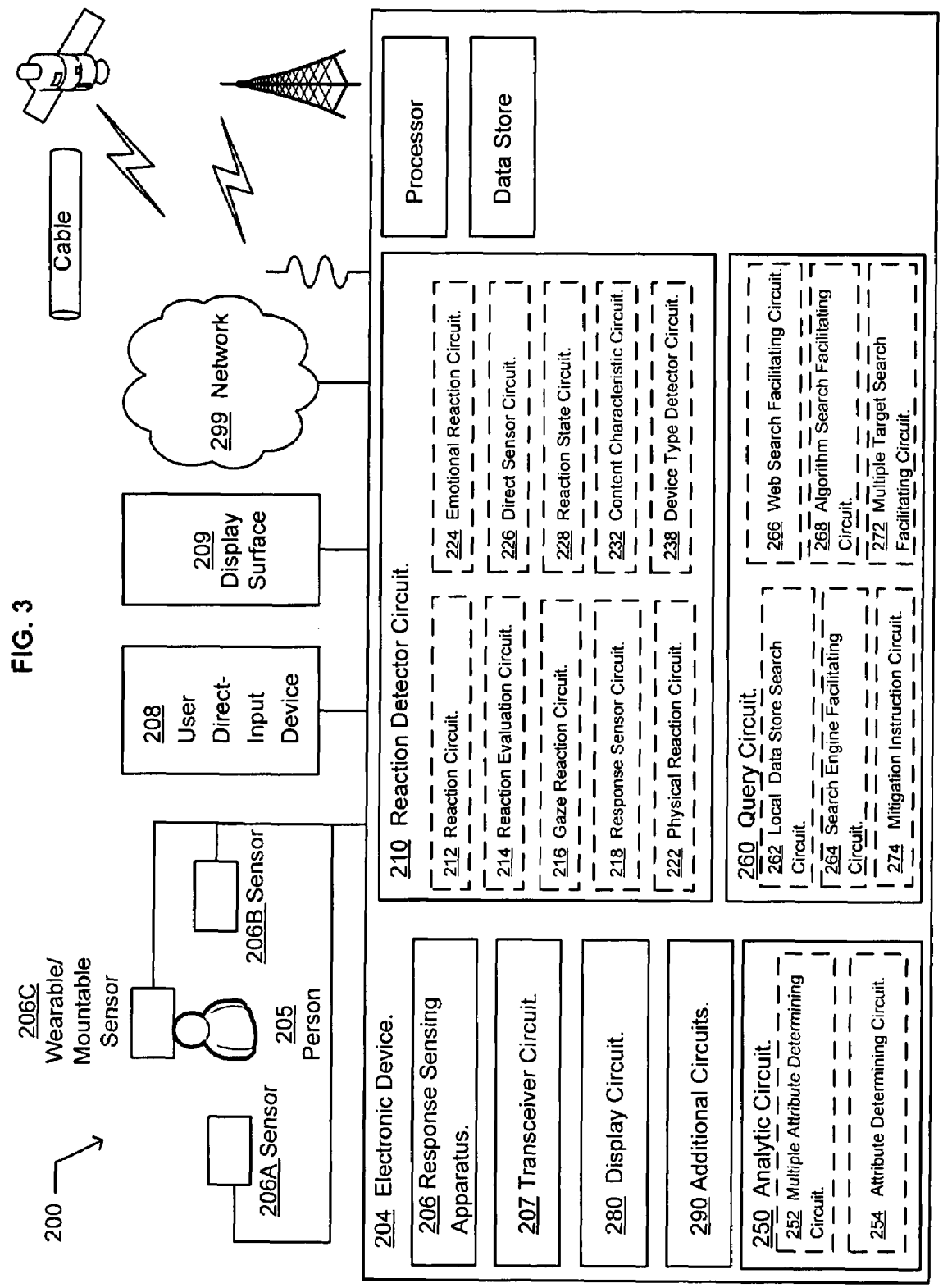
FIG. 3 illustrates an example environment in which embodiments may be implemented.

FIG. 3 illustrates an example environment 200 in which embodiments may be implemented. The example environment includes an electronic device 204, a response sensing apparatus 206, a transceiver circuit 207, a user direct-input device 208, and a display surface 209. In some embodiments, one or more of the response sensing apparatus, the transceiver circuit, the user direct-input interface, and the display surface may be structurally distinct from the remaining circuits or the electronic device. The response sensing apparatus includes at least one user sensor operable to acquire data indicative of a response by a person 205 to a content displayed by or on the display surface. The at least one user sensor is illustrated as a sensor 206A, a sensor 206B, and a wearable/mountable sensor 206C. The at least one user sensor may be physically incorporated with the electronic device, or may be physically separate from the electronic device and electronically coupled with the device. The user direct-input device 208 includes at least one device that may be used by the person to directly interact with the electronic device, such as the mouse 161, keyboard 162, microphone 163, and/or speakers 197 described in conjunction with FIG. 2, or a touch screen, such as the display 32 combined with the screen input detector 33 described in conjunction with FIG. 1. The display surface may include any surface suitable for displaying a content to the person. The display surface may include the monitor 191 described in conjunction with FIG. 2, or a surface such as a wall or another planar surface (not shown) onto which a content may be projected for display to the person. The display surface may be physically incorporated with the electronic device, or may be physically separate from the electronic device and electronically coupled with the device.

The electronic device 204 may include a wired or wireless access to digital content using the transceiver 207, such as via a network 299. In an alternative embodiment, the electronic device may be coupled to the network via a wireless link, a satellite link, and/or a wired link.

In an embodiment, the electronic device 204 includes a reaction detector circuit 210, an analytic circuit 250, a query circuit 260, and a display circuit 280. In some embodiments, one or more of the reaction detector circuit, the analytic determining circuit, the query circuit, and/or the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 204 using the user direct-input device 208.

The electronic device 204 may include at least one additional circuit. The at least one additional circuit may include additional circuits 290. In addition, the electronic device may include a processor (not illustrated), such as the processing unit 21 described in conjunction with FIG. 1, and/or the processor 120 described in conjunction with FIG. 2. In further addition, the electronic device may include a computer storage media illustrated as a data store. In an embodiment, the electronic device 204 may include a mobile electronic device.

In an embodiment, the reaction detector circuit 210 may include at least one additional circuit. The at least one additional circuit may include at least one of a reaction circuit 212, reaction evaluation circuit 214, a gaze reaction circuit 216, a response sensor circuit 218, a physical reaction circuit 222, an emotional reaction circuit 224, a direct sensor circuit 226, a reaction state circuit 228, a content characteristic circuit 232, and/or a device type detector circuit 236.

In another embodiment, the analytic circuit 250 may include at least one additional circuit. The at least one additional circuit may include at least one of a multiple attribute determining circuit 252 and/or an attribute determining circuit.

In a further embodiment, the query circuit 260 may include at least one additional circuit. The at least one additional circuit may include at least one of a local data store search circuit 262, a search engine facilitating circuit 264, a mitigation instruction circuit 274, a Web search facilitating circuit 266, an algorithm search facilitating circuit, and/or a multiple target search facilitating circuit 272.

Figure 4:
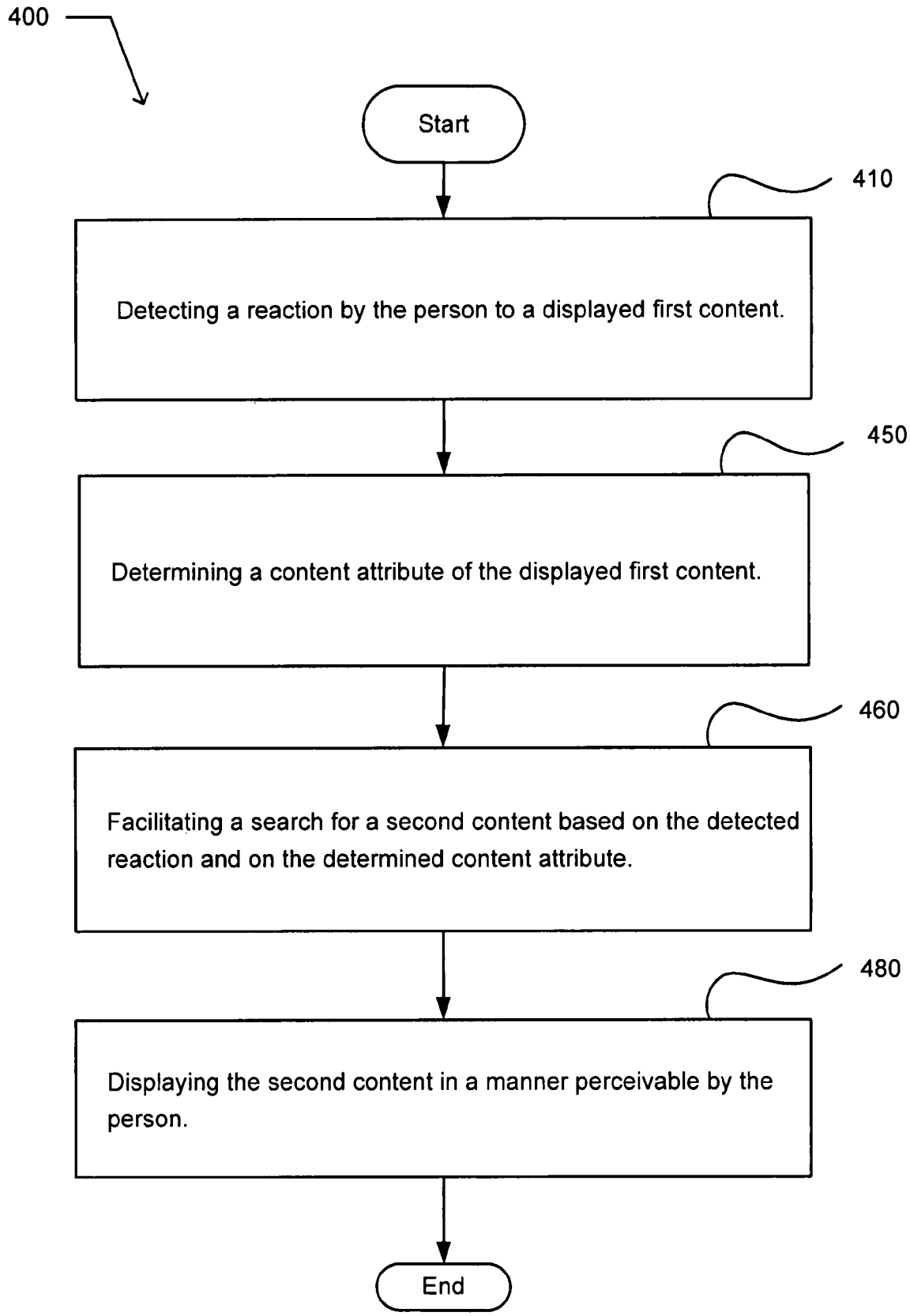
FIG. 4 illustrates an example of an operational flow implemented in an environment that includes a person interacting with an electronic device using a user direct-input device.

FIG. 4 illustrates an example of an operational flow 400 implemented in an environment that includes a person interacting with an electronic device using a user direct-input device. In an alternative embodiment, the environment that includes a person interacting with an electronic device using a user direct-input device further includes environment that includes a person viewing content displayed by an electronic device and directly interacting with the electronic device using a user direct-input device. FIG. 4 and several following figures may include various examples of operational flows, discussions, and explanations with respect to the above-described environment 200 of FIG. 3, and/or with respect to other examples and contexts. However, it should be understood that the operational flows may be executed in a number of other environments and contexts, and/or in modified versions of FIG. 3. Also, although the various operational flows are illustrated in a sequence(s), it should be understood that the various operations may be performed in other orders than those which are illustrated, and/or may be performed concurrently.

After a start operation implemented in the environment that includes a person viewing content displayed by an electronic device using a user direct-input device, the operational flow 400 includes an observation operation 410. The observation operation detects a reaction by the person to a displayed first content. The observation operation may be implemented using the reaction detector circuit 210, and/or the response sensing apparatus 206. An analytical operation 450 determines a content attribute of the displayed first content. The analytical operation may be implemented using the analytic circuit 250. A query operation 460 facilitates a search for a second content based on the detected reaction by the observation operation and on the determined content attribute by the investigation operation. The query operation may be implemented using the query circuit 260. A broadcast operation 480 displays the second content in a manner perceivable by the person. The broadcast operation may be implemented using the display circuit 280. The operational flow 400 then proceeds to an end operation.

In an embodiment, the observation operation 410 may be implemented using the reaction detector circuit 210 of FIG. 3. For example, optically based observation data of the person 205 may be acquired by the sensor 206A, and/or sensor 206B. Physiological based data of the person may be acquired by the wearable/mountable sensor 206C. A circuit in the response sensing apparatus 206 may transform data acquired by the sensors 206A-206C into data indicative of a response by the person to the displayed first content. For example, a response may include at least one of a change in breathing rate, a change in heart rate, eye movements, facial movements, gaze direction and/or time, or a brain wave pattern. Another circuit in the response sensing circuit may detect a reaction by the person to a displayed first content based on the data indicative of a response by the person to the displayed first content. For example, a facial response that includes the person moving the ends of their lips above the center portion of the lips may be detected as a "smile" reaction or a "positive" reaction. A facial response that includes the person moving the ends of the lips below the center portion of the lips may be detected as a "frown" reaction or a "negative" reaction. The observation operation does not include data directly inputted by the person 205 using the user direct-input device 208, such as keyboard, mouse, and voice commands entered by the user through the user direct-input device. However, in an alternative embodiment, the observation operation may include at least one of a quality, or a manner of the person's input of data using the direct-input device. For example, the observation operation may acquire data indicative of the person shouting a voice command without regard to a nature of the voice command, or the person striking keys of the keyboard particularly hard without regard to the keyed command or text. In a further embodiment, the observation operation may acquire sensor data indicative of the person shouting a voice command and associate a reaction with the nature of the voice command. For example, data indicative of a loud voice response may be associated with a spoken command "Delete this Web page" as a negative reaction to the content of the Web page.

In an embodiment, data indicative of a response may include data indicative of at least one of a person's gaze, attention, gaze dwell time, facial movements, eye movements, pupil dilation, physiological parameters (heart rate, respiration rate, etc.), stance, sub-vocalization (and other non-word audio), P-300 response, brain waves, brain patterns, or other detectable aspects. In another embodiment, data indicative of a response may include data indicative of at least one of a person's physiological, behavioral, emotional, voluntary, or involuntary response. In a further embodiment, data indicative of a response may include data acquired by functional near-infrared spectroscopy (fNIRS) indicative of a response. fNIRS data may be acquired by a fNIRS device, an embodiment of which is illustrated as the wearable/mountable sensor 206C.

In another embodiment, the observation operation 410 detects a reaction by the person to a displayed first content by applying pattern recognition to the data indicative of a response by the person to the displayed first content. For example, a reaction may include a response that reveals the person 205's feelings or attitude toward the displayed first content. In a further embodiment, the observation operation detects a reaction by the person to a displayed first content by applying pattern matching to the data indicative of a response by the person to the displayed first content.

In use, an embodiment of the operational flow 400 may illustrated by reference to FIG. 3. For example, a first content may be displayed to the person 205 on a portion of the display surface 209, such as a screen of BlackBerry® or other PDA electronic device. In this example, the displayed first content may be a picture of a new car from a brother of the person 205. Data indicative of a response by the person 205 to the displayed new car is acquired using at least one of sensors 206A-206C. The observation operation 410 determines a reaction by the person to the displayed new car based on the data indicative of a response. If, for example, the data indicates an upward movement of the ends of the person's lips and an opening of their eyes, a positive reaction may be detected. The analytical operation 450 determines a content attribute of the displayed picture of the brother's new car. A content attribute may include at least one of a manufacturer of the new car, a color of the new car, or a body style of the new car, such as a convertible, coupe, four-door, or SUV. The query operation 460 facilitates a search for a second content based on the detected reaction (positive) and on the determined content attribute (convertible sports car). The search may be facilitated by communicating with an Internet based search service, such as Google, Yahoo, and/or Live Search. The broadcast operation 480 displays a second content in a manner perceivable by the person by receiving a result of the facilitated search that includes an indication of the second content, and displaying the second content using the display surface 209. For example, the second content may include a picture of next year's model of the same car as the brother's new car.

Figure 5:
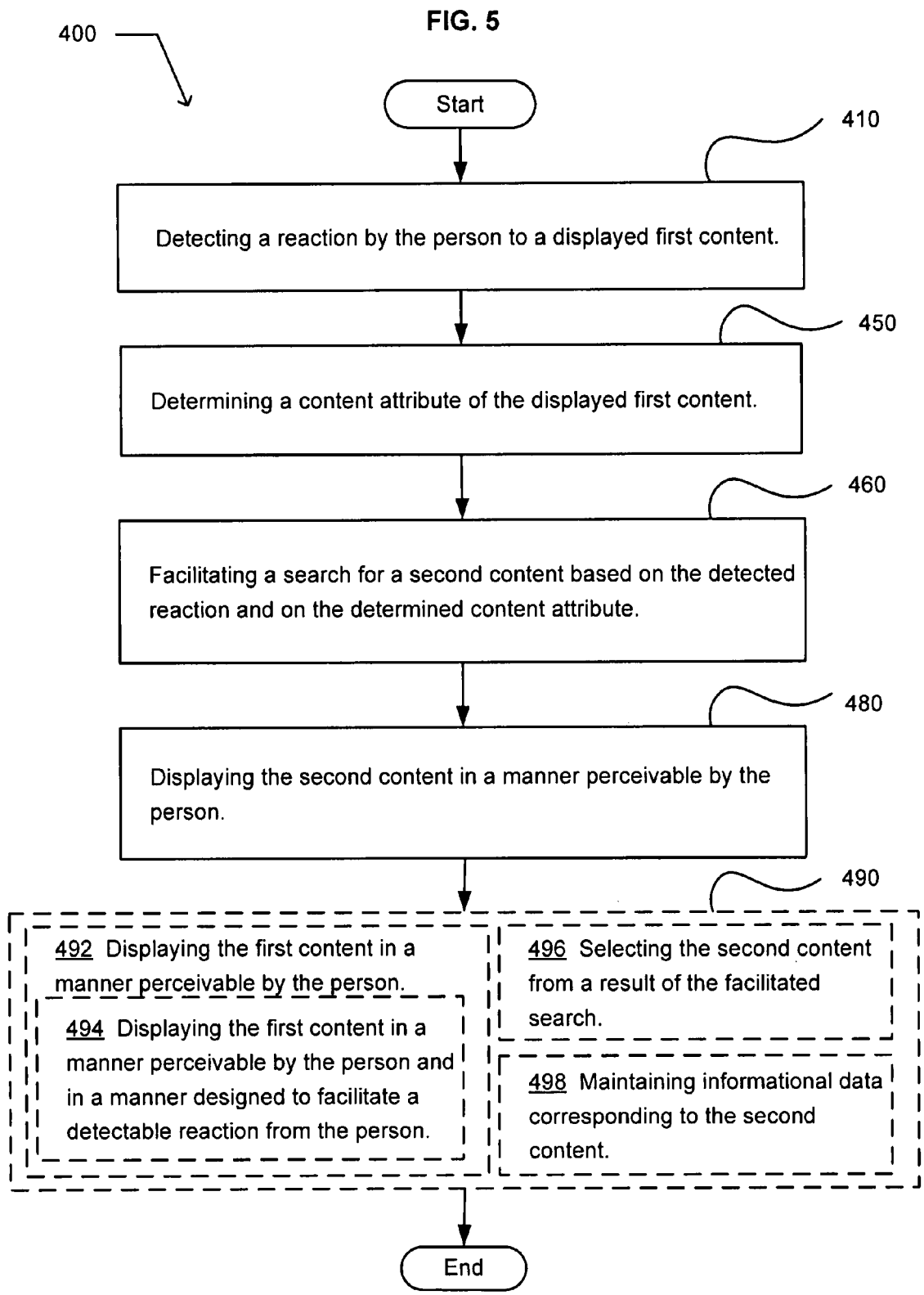
FIG. 5 illustrates an alternative embodiment of the operational flow of FIG. 4.

FIG. 5 illustrates an alternative embodiment of the operational flow 400 of FIG. 4. The operational flow may include an additional operation 490. The additional operation may include at least one of an operation 492, an operation 494, an operation 496, or an operation 498. The operation 492 displays the first content in a manner perceivable by the person. The operation 492 may include at least one additional operation, such as the operation 494. The operation 494 displays the first content in a manner perceivable by the person and in a manner designed to facilitate a detectable reaction from the person. The operation 496 selects the second content from a result of the facilitated search. In an embodiment, the second content may be selected in response to an algorithm that includes a machine learning aspect. In an alternative embodiment, the selection algorithm may include a pattern recognition algorithm. The operation 498 maintains informational data corresponding to the second content. The operation 490 may be implemented using at least one circuit of the additional circuits 290 of FIG. 3.

Figure 6:
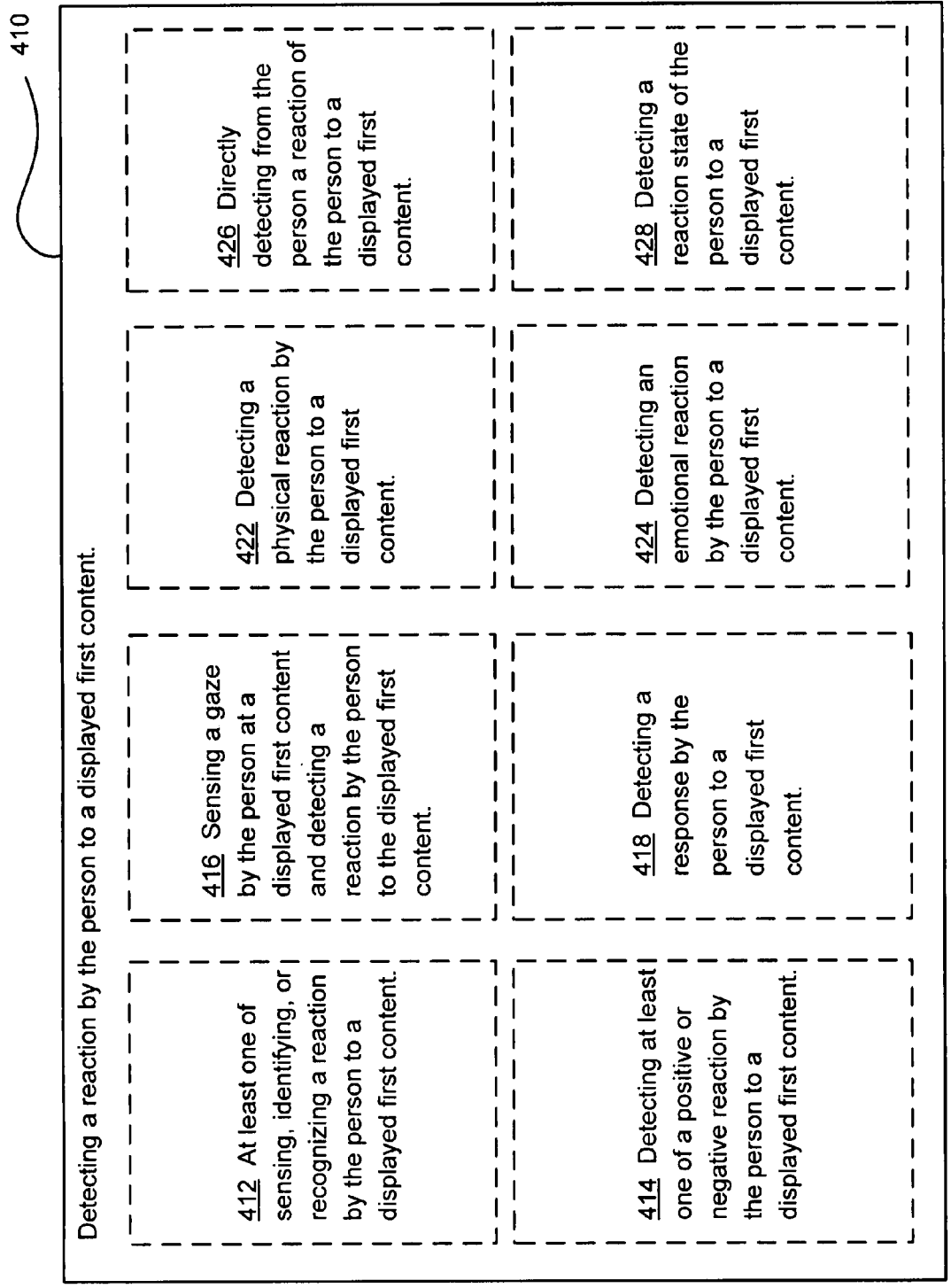
FIG. 6 illustrates another alternative embodiment of the operational flow of FIG. 4.

FIG. 6 illustrates another alternative embodiment of the operational flow 400 of FIG. 4. The observation operation 410 may include at least one additional operation. The at least one additional operation may include an operation 412, an operation 414, an operation 416, an operation 418, an operation 422, an operation 424, an operation 426, or an operation 428. The operation 412 includes at least one of sensing, identifying, or recognizing a reaction by the person to a displayed first content. The operation 412 may be implemented using the reaction circuit 212 of FIG. 3. The operation 414 includes detecting at least one of a positive or negative reaction by the person to a displayed first content. The operation 414 may be implemented using the reaction evaluation circuit 214. The operation 416 includes sensing a gaze by the person at a displayed first content and detecting a reaction by the person to the displayed first content. The operation 416 may be implemented using the gaze reaction circuit 216. The operation 418 includes detecting a response by the person to a displayed first content. The operation 418 may be implemented using the response sensor circuit 218. The operation 422 includes detecting a physical reaction by the person to a displayed first content. The operation 422 may be implemented using the physical reaction circuit 222. The operation 424 includes detecting an emotional reaction by the person to a displayed first content. The operation 424 may be implemented using the emotional reaction circuit 224. The operation 426 includes directly detecting from the person a response of the person to a displayed first content. The operation 426 may be implemented using the direct sensor circuit 226. The operation 428 includes detecting a reaction state of the person to a displayed first content. The operation 428 may be implemented using the reaction state sensor circuit 228.

Figure 7:
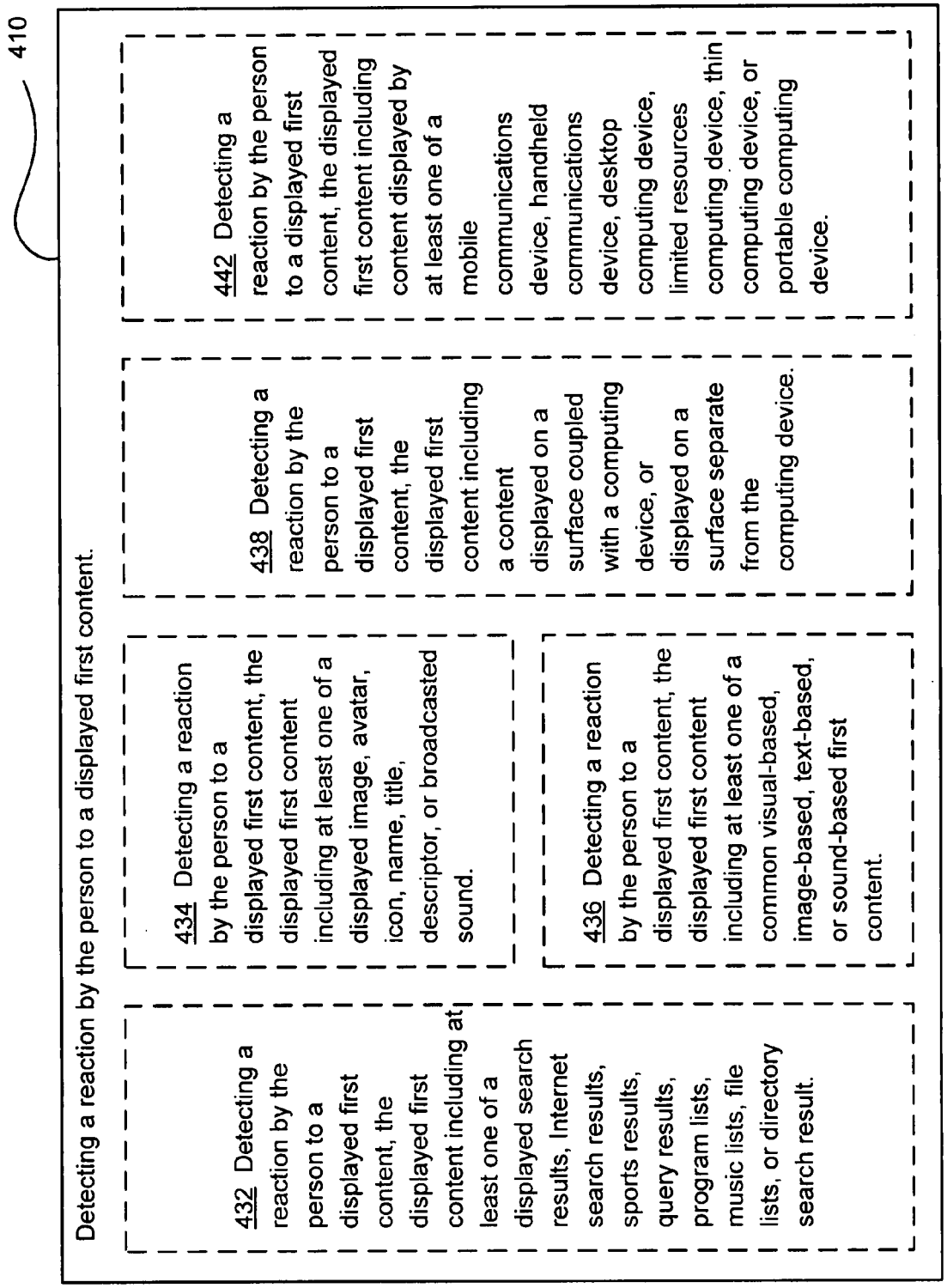
FIG. 7 illustrates a further alternative embodiment of the operational flow of FIG. 4.

FIG. 7 illustrates a further alternative embodiment of the operational flow 400 of FIG. 4. The observation operation 410 may include at least one additional operation. The at least one additional operation may include an operation 432, an operation 434, an operation 436, an operation 438, or an operation 442. The operation 432 includes detecting a reaction by the person to a displayed first content. The displayed first content includes at least one of a displayed search result, Internet search results, such as from a search provider such as Google, Yahoo, or Live Search. Alternatively, the displayed first content may include sports scores, or news. For example, the displayed search results may include a displayed result of a restaurant search, a movie search, or car repair shops. In further alternative, the displayed first content may include a program list, a music list, a file lists, or directory search result of locally stored files. The operation 434 includes detecting a reaction by the person to a displayed first content. The displayed first content includes at least one of a displayed image, avatar, icon, name, title, descriptor, or broadcasted sound. For example, a title may include a song title, a book title, or a movie title. The operation 436 includes detecting a reaction by the person to a displayed first content. The displayed first content includes at least one of a visual-based, image-based, text-based, or sound-based content. The operations 432, 434, and/or 436 may be implemented using the content characteristic circuit 232.

The operation 438 includes detecting a reaction by the person to a displayed first content. The displayed first content includes a content displayed on a surface coupled with a computing device, such as a built-in screen of the computing device or a screen physically coupled with computing device, or displayed on a surface separate from the computing device, such as projected onto a separate screen or a wall surface. The operation 442 includes detecting a reaction by the person to a displayed first content. The displayed first content includes a content displayed by at least one of a mobile communications device, handheld communications device, desktop computing device, limited resources computing device, thin computing device, or portable computing device. The operations 438 and/or 442 may be implemented using the device type detector circuit.

FIG. 8 illustrates an alternative embodiment of the operational flow 400 of FIG. 4. The analytical operation 450 may include at least one additional operation. The at least one additional operation may include an operation 452, or an operation 454. The operation 452 includes determining at least two content attributes of the displayed first content. The operation 452 may be implemented using the multiple attribute determining circuit 252. The operation 454 includes determining a content attribute of the displayed first content. The determined content attribute may include at least one of a category, tag, subject, color, texture, or theme attribute of the displayed first content. For example, a theme attribute may include a sunset, famous athlete, convict, dog, cat, horse, car, airplane, flower, people, inventor, or entertainer attribute. The operation 454 may be implemented using the attribute determining circuit 254.

FIG. 9 illustrates another alternative embodiment of the operational flow 400 of FIG. 4. The query operation 460 may include at least one additional operation. The at least one additional operation may include an operation 462, an operation 464, an operation 466, an operation 468, an operation 472, or an operation 474. The operation 462 includes searching a local data store for a second content based on the detected reaction and on the determined content attribute. In an embodiment, the local data store may include a hard drive having at least one of stored music, or stored video files. The operation 462 may be implemented using the local data store search circuit 262. The operation 464 includes facilitating a search by a search engine for a second content based on the detected reaction and on the determined content attribute. The operation 464 may be implemented using the search engine facilitating circuit 264. The operation 466 includes facilitating a search by a Web search engine for a second content based on the detected reaction and on the determined content attribute. For example, a Web search engine provides the person 205 with tools to search through Web sites, images, videos, news, and a number of other categories. In an embodiment, a Web search engine includes at least one of Google, Yahoo, or Live Search. The operation 466 may be implemented using the Web search facilitating circuit 266. The operation 468 includes facilitating a search for a second content by a search algorithm responsive to the detected reaction and on the determined content attribute. The operation 468 may be implemented using the algorithm search facilitating circuit 268. The operation 472 includes facilitating a search for at least two instances of a second content based on the detected reaction and on the determined content attribute. The operation 472 may be implemented using the multiple target search facilitating circuit 272. The operation 474 includes facilitating a search for a second content based on at least one of a positive correlation, or a negative correlation between the detected reaction and on the determined content attribute. For example, the search may be facilitated based upon a detected positive reaction by the person and on the determined content attribute to locate a second content that is more of the same as the first content. In another example, the search may be facilitated based upon a detected negative reaction by the person and on the determined content attribute to locate a second content that is different from the first content.

Figure 10:
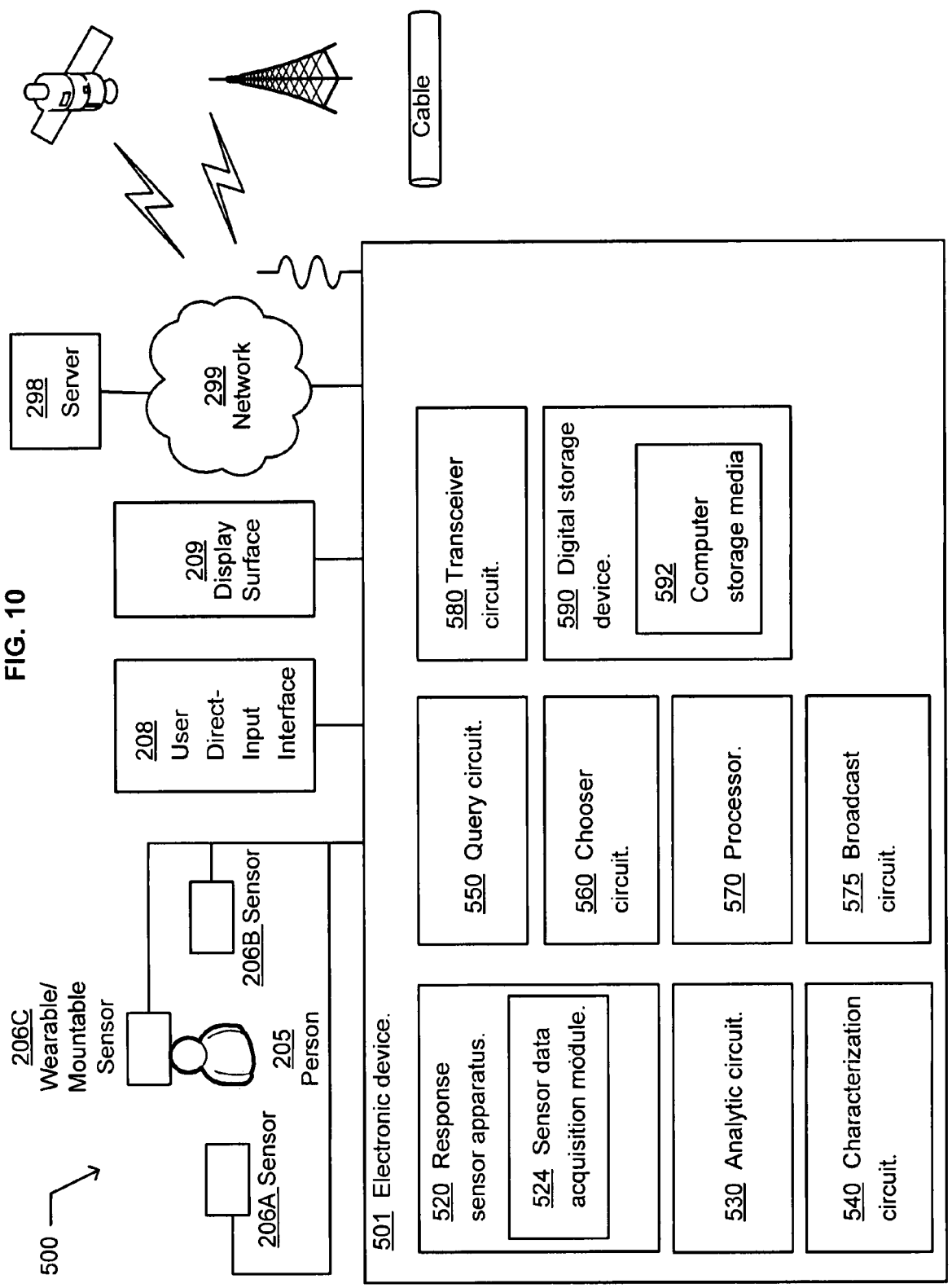
FIG. 10 illustrates an example environment.

FIG. 10 illustrates an example environment 500. The environment includes an electronic device 501 that is coupleable to a network 299, and which may be used by a person 205. The electronic device may be coupled to the network via a wired link, illustrated as a cable link, and/or a wireless link illustrated as a satellite link. The electronic device includes the user direct-input device 208, the display surface 209, a response sensor apparatus 520, an analytic circuit 530, a characterization circuit 540, a query circuit 550, and a chooser circuit 560. In an alternative embodiment, the electronic device includes at least one of a portable electronic device, or a mobile electronic device.

The display surface 209 includes a display surface operable to display electronic content in a manner perceivable by a person. In an embodiment, the electronic content includes electronically stored information. In another embodiment, electronically stored content may include electronically stored content as described in Federal Rule of Civil Procedure 26(f). In a further embodiment, electronic content may include at least one of electronically stored text, Web content, picture, image, or streaming image. The response sensor apparatus 520 includes the sensor 206A, the sensor 206B, the wearable/mountable sensor 206C, and a sensor data acquisition module 524. The response sensor apparatus includes a sensor apparatus operable to acquire data indicative of a response by the person 205 to a first electronic content displayed on the surface 209.

The analytic circuit 530 includes an analytic circuit operable determine an indication of an expression by the person corresponding with the displayed first electronic content, the determination based on the data indicative of a response. In an embodiment, the expression by the person may include at least one of an expression by the person of interest, disinterest, like, dislike, happiness, or anger. The characterization circuit 540 includes a characterization circuit operable to determine an attribute of the displayed first electronic content. The query circuit 550 includes a query circuit operable to cause a search for a second electronic content corresponding to the indication of expression and to the attribute of the first electronic content. The chooser circuit 560 includes a chooser circuit operable to select the second electronic content from a result of the search.

In an alternative embodiment, the electronic device 501 may include a digital storage device 590 operable to save the selected second electronic content. In another embodiment, the electronic device may include a broadcast circuit 575 operable to facilitate a display at least the first electronic content and the selected second electronic content. In a further embodiment, the electronic device may include a receiver circuit, illustrated as a transceiver circuit 580, operable to receive a result of the initiated search.

In an alternative embodiment, the display surface 209 may include a display surface operable to display electronic content in a manner perceivable by a person 205 and in a manner designed to facilitate sensing a response by the person. In another embodiment, the response sensor apparatus 520 may include a sensor apparatus operable to acquire data indicative of a physically manifested response by the person to a first electronic content displayed on the surface. In a further embodiment, the analytic circuit 530 may include an analytic circuit operable determine an indication of an emotional expression by the person corresponding with the displayed first electronic content, the determination based on the data indicative of a response.

FIG. 11 illustrates an example computer program product 600. The computer program product includes a computer-readable storage medium 610 bearing program instructions 620. The program instructions are operable to perform a process in a computing device. The process includes detect a reaction by a person to a displayed first content. The process also includes determine a content attribute of the displayed first content. The process further includes facilitate a search for a second content based on the detected reaction and on the determined content attribute. The process also includes select the second content from a result of the facilitated search, and save data indicative of the selected second content. In an alternative embodiment 622, the process may include facilitating a display of the selected second content.

Figure 12:
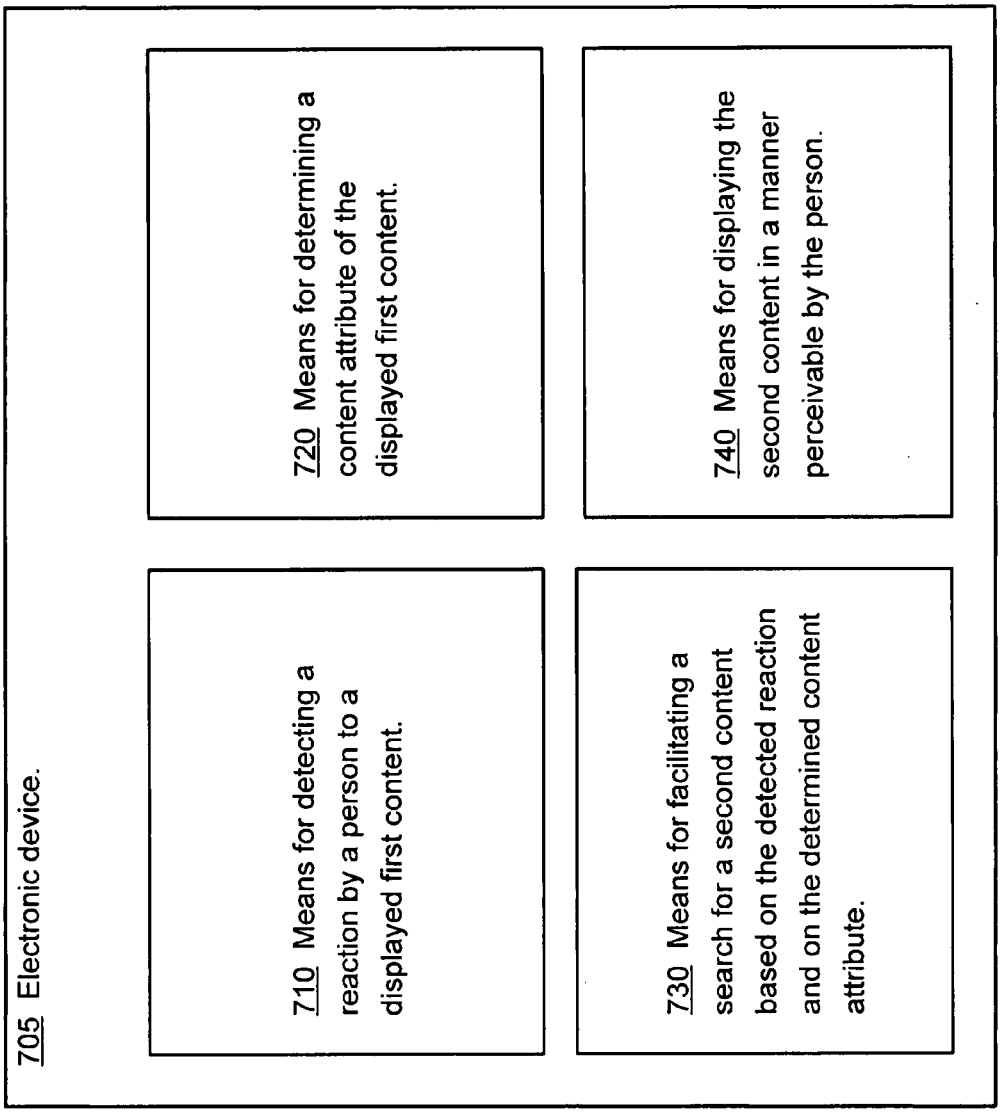
FIG. 12 illustrates an example environment that includes an electronic device.

FIG. 12 illustrates an example environment 700 that includes an electronic device 705. The electronic device includes means 710 for detecting a reaction by a person to a displayed first content. The electronic device also includes means 720 for determining a content attribute of the displayed first content. The electronic device further includes means 730 for facilitating a search for a second content based on the detected reaction and on the determined content attribute. The electronic device includes means 740 for displaying the second content in a manner perceivable by the person.

FIG. 13 illustrates an example operational flow 800 implemented in an environment that includes a person viewing content displayed by an electronic device. In an alternative embodiment, the operational flow is 800 implemented in an environment that includes a person viewing content displayed by an electronic device and directly interacting with the electronic device via a user interface. After a start operation, a discovery operation 810 includes detecting a reaction by the person to a displayed first content. In an embodiment, the detected reaction includes at least one of a detected gesture, movement, physiological, or physical reaction. A call operation 820 includes transmitting a search request for a second content corresponding to the detected reaction and to an attribute of the displayed first content. A reception operation 830 includes receiving a response to the search request that includes at least an indication of the second content. A broadcast operation 840 includes displaying the second content. The operational flow the proceeds to an end operation.

In an alternative embodiment, the operational flow may include at least one additional operation 850. The at least one additional operation may include an operation 852, and/or an operation 854. The operation 852 includes determining a content attribute of the displayed first content. The operational flow 854 includes selecting the second content from the response to the search request.

Returning to FIG. 10, an alternative embodiment of the example environment 500 includes the electronic device 501 coupleable to a network 299. The display surface 209 includes a display surface operable to display electronic content in a manner perceivable by the person 205. The response sensor apparatus 520 includes a sensor apparatus operable to acquire data indicative of a response by the person to a first electronic content displayed on the surface. The analytic circuit 530 includes an analytic circuit operable to detect a reaction by a person to a displayed first content in response to the acquired data. The query circuit 550 includes a query circuit operable to transmit a search request for a second electronic content that corresponds to the detected reaction and to an attribute of the displayed first content. For example, the search request may be addressed to the server 298 and transmitted over the network 299. The transceiver circuit 580 includes a receiver circuit operable to receive a response to the search request that includes at least an indication of the second content.

In another alternative embodiment, the chooser circuit 560 may include a chooser circuit operable to select the second electronic content from the received response to the search request. In a further embodiment, the broadcast circuit 575 may include a broadcast circuit operable to facilitate a display of the first electronic content and the second electronic content. In another embodiment, the transceiver circuit 580 may include a receiver circuit operable to receive a result of the initiated search. In a further embodiment, the digital storage device 590 may include a digital storage device operable to save the received response to the search request. In another embodiment, the display surface 209 may include a display surface operable to display electronic content in a manner perceivable by the person and in a manner designed to facilitate sensing a response by the person. In a further embodiment, the sensor apparatus 520 may include a sensor apparatus operable to acquire data indicative of a physically manifested response by the person to a first electronic content displayed on the surface.

FIG. 14 illustrates an example computer program product 860. The computer program product includes a computer-readable computer storage medium 862 bearing program instructions 864. The program instructions are operable to perform a process in a computing device. The process includes detect a reaction by a person to a displayed first content. The process also includes transmit a search request for a second content corresponding to the detected reaction and to an attribute of the displayed first content. The process further includes receive a response to the search request that includes at least an indication of the second content. The process also includes save data indicative of the received response to the search request. The process further includes display the second content. In an alternative embodiment, the process may include select the second content from the received response to the search request 866.

Figure 15:
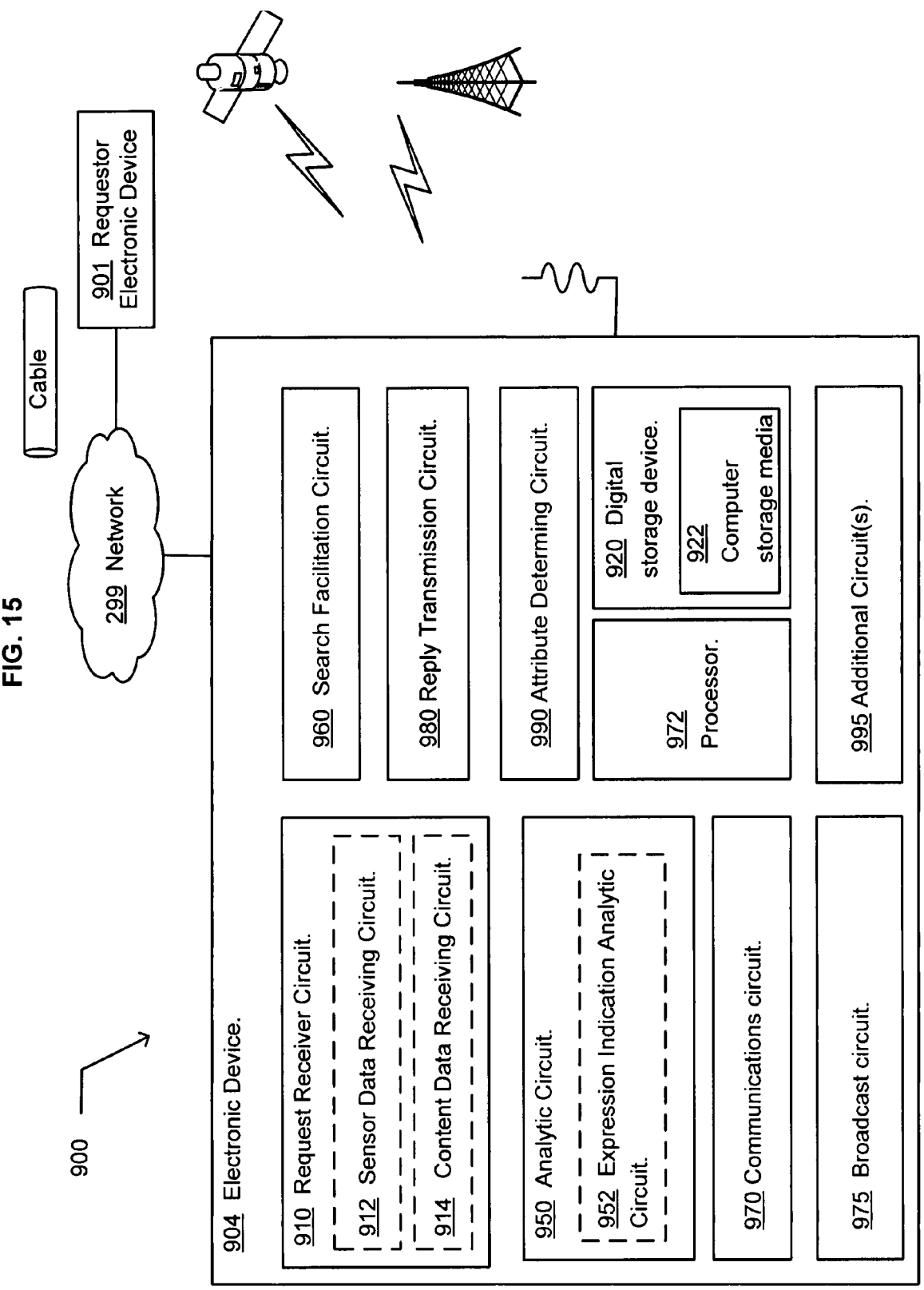
FIG. 15 illustrates an example environment in which embodiments may be implemented.

FIG. 15 illustrates an example environment 900 in which embodiments may be implemented. The example environment includes an electronic device 904 that includes a request receiver circuit 910, an analytic circuit 950, a search facilitation circuit 960, and a reply transmission circuit 980. In some embodiments, one or more of the request receiver circuit, the analytic circuit, the search facilitation circuit, and the reply transmission circuit may be structurally distinct from the remaining circuits or the electronic device. The electronic device 904 may include a wired or wireless access to a requestor electronic device 901 via the network 299 using the communications circuit 970. In an alternative embodiment, the electronic device may be coupled to the network via a wireless link, a satellite link, and/or a wired link. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware.

The electronic device 904 may include at least one additional circuit. The at least one additional circuit may include additional circuit(s) 995. In addition, the electronic device may include a processor 972, such as the processing unit 21 described in conjunction with FIG. 1, and/or the processor 120 described in conjunction with FIG. 2. In further addition, the electronic device may include a digital storage media 920, a communications circuit 970, and/or a broadcast circuit 975. In an embodiment, the electronic device 904 may include a network server electronic device, or a group of network server electronic devices.

In an embodiment, the request receiver circuit 910 may include at least one additional circuit. The at least one additional circuit may include at least one of a sensor data receiving circuit 912, and/or a content data receiving circuit 914. In another embodiment, the analytic circuit 950 may include at least one additional circuit, such as an expression indication analytic circuit 952.

Figure 16:
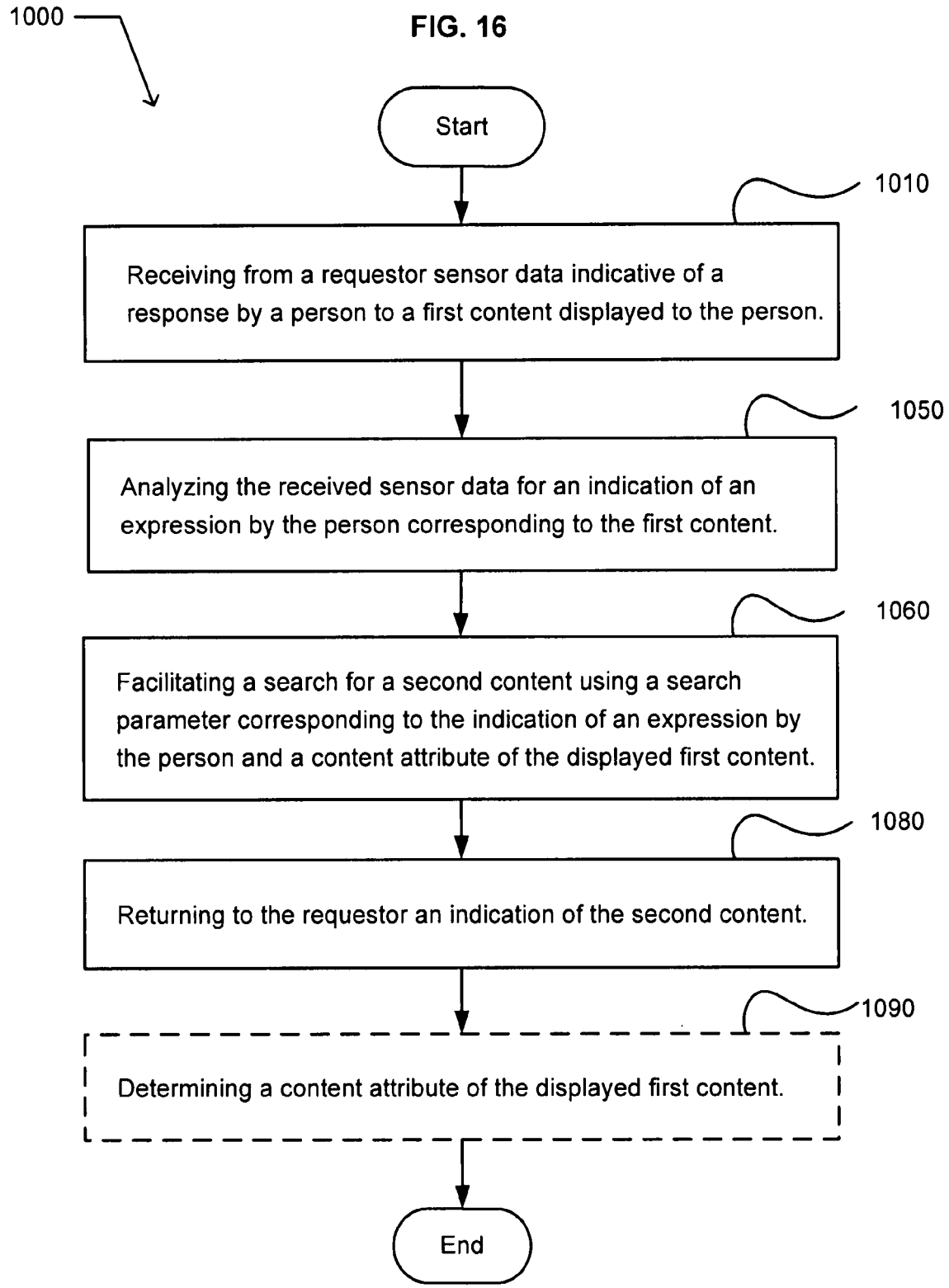
FIG. 16 illustrates an example operational flow.

FIG. 16 illustrates an example operational flow 1000. FIG. 16 and several following figures may include various examples of operational flows, discussions, and explanations with respect to the above-described environment 900 of FIG. 15, and/or with respect to other examples and contexts. However, it should be understood that the operational flows may be executed in a number of other environments and contexts, and/or in modified versions of FIG. 15. Also, although the various operational flows are illustrated in a sequence(s), it should be understood that the various operations may be performed in other orders than those which are illustrated, and/or may be performed concurrently.

After a start operation, the operational flow 1000 includes a reception operation 1010. The reception operation includes receiving, from a requester, sensor data indicative of a response by a person to a first content displayed to the person. In an alternative embodiment, the reception operation includes receiving the sensor data from a requestor via at least one of a network, or the Internet. The reception operation may be implemented using the request circuit 910 of FIG. 15. An analysis operation 1050 includes analyzing the received sensor data for an indication of an expression by the person corresponding to the first content. The analysis operation may be implemented using the analytic circuit 950. A query operation 1060 includes facilitating a search for a second content using a search parameter corresponding to the indication of an expression by the person and to a content attribute of the displayed first content. In an alternative embodiment, the search may include at least one of a search of a local data store, a search by a search engine, or a search by a Web search engine. The query operation may be implemented using the search circuit 960. A reply operation 1080 includes returning to the requestor an indication of the second content. The indication of the second content may be returned to the requester via at least one of a network, or the Internet. The reply operation may be implemented using the reply transmission circuit 980. The operational flow 400 includes an end operation.

In an alternative embodiment, the operational flow 1000 may include at least one additional operation, such as an operation 1090. The operation 1090 includes determining a content attribute of the displayed first content. The operation 1090 may be implemented using the attribute determining circuit 990.

Figure 17:
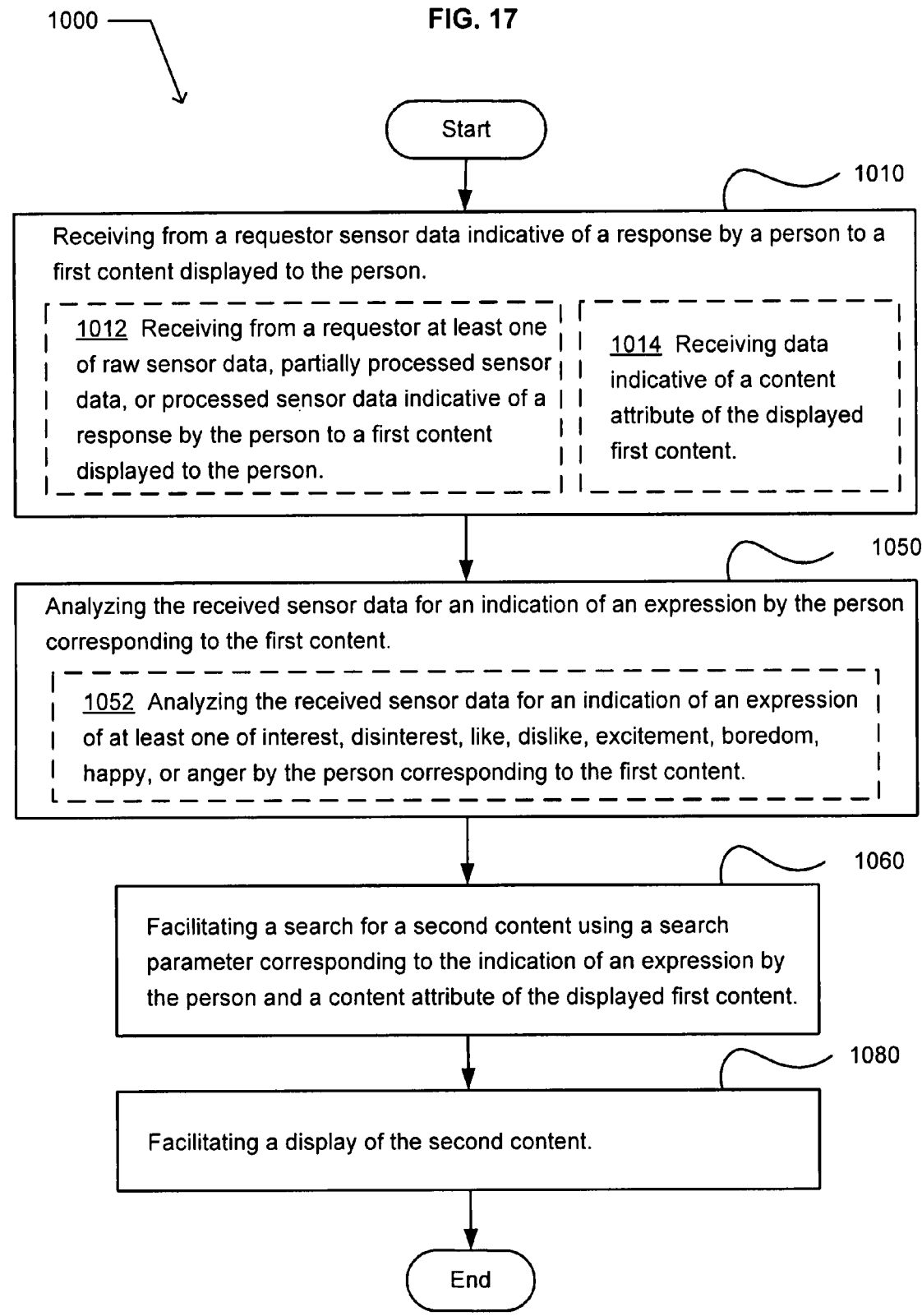
FIG. 17 illustrates another alternative embodiment of the operational flow of FIG. 16.

FIG. 17 illustrates another alternative embodiment of the operational flow 1000 of FIG. 16. The reception operation 1010 may include at least one additional operation. The at least one additional operation may include an operation 1012, or an operation 1014. The operation 1012 includes receiving from a requestor at least one of raw sensor data, partially processed sensor data, or processed sensor data indicative of a response by the person to a first content displayed to the person. The operation 1012 may be implemented using the sensor data receiving circuit 912. The operation 1014 includes receiving data indicative of a content attribute of the displayed first content. The operation 1014 may be implemented using content data receiving circuit 914.

The analysis operation 1050 may include at least one additional operation, such as an operation 1052. The operation 1052 includes analyzing the received sensor data for an indication of an expression of at least one of interest, disinterest, like, dislike, excitement, boredom, happy, or anger by the person corresponding to the first content. The operation 1052 may be implemented using the expression indication analytic circuit 952.

Figure 18:
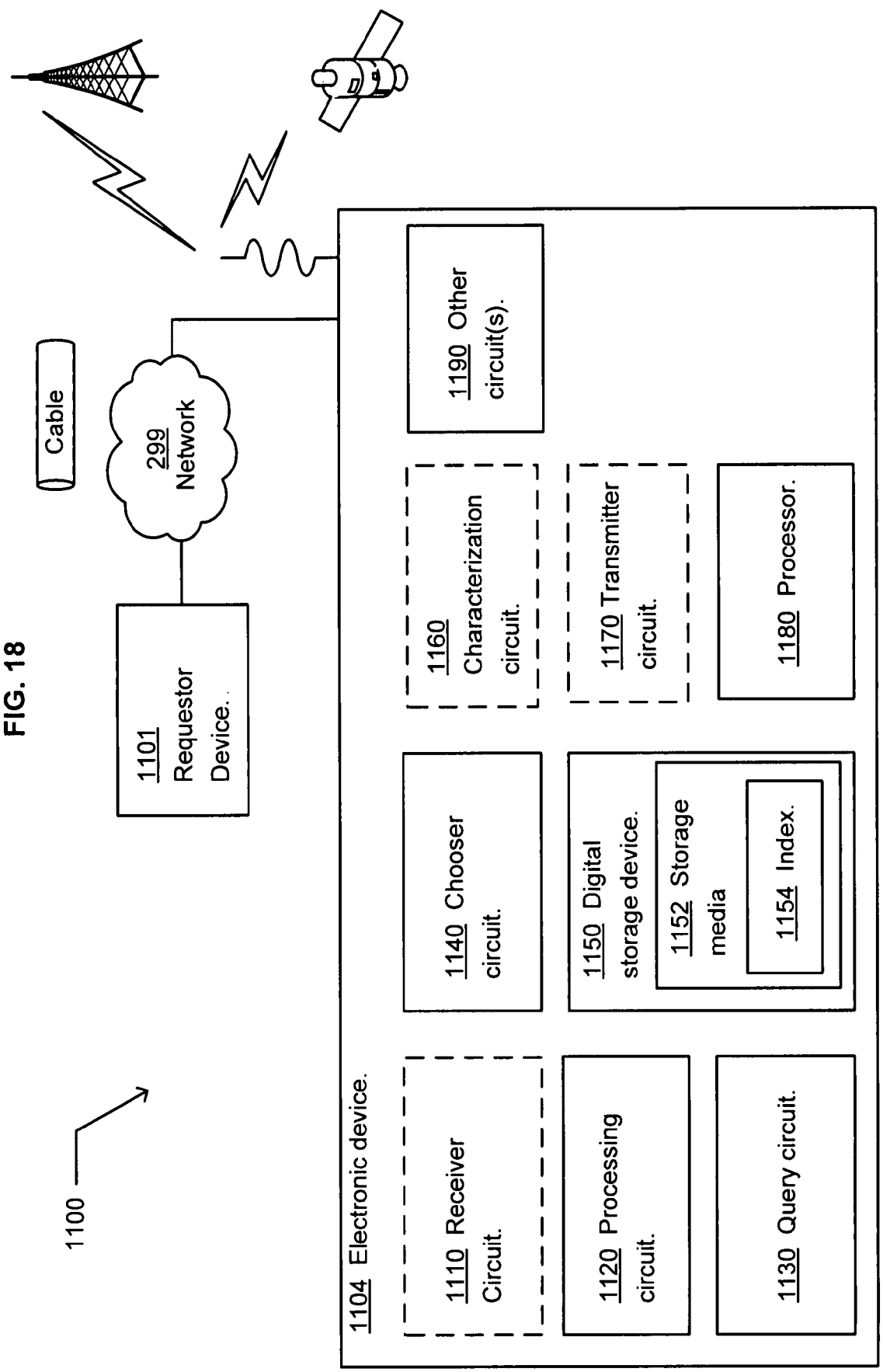
FIG. 18 illustrates an example system.

FIG. 18 illustrates an example system 1100. The example system includes an electronic device 1104 operable to exchange communications with a requestor device 1101 using the network 299, via for example, a wireless link, a satellite link, and/or a wired link. The electronic device includes a processing circuit 1120, a query circuit 1130, a chooser circuit 1140, and a digital storage device 1150. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machinery of the electronic device may be implemented in hardware, software, and/or firmware.

The processing circuit 1120 includes a processing circuit operable to analyze received sensor data for an indication of an expression by a person corresponding to a first displayed electronic content. For example, the received sensor data may include sensor data acquired by the response sensing apparatus 206 described in conjunction with FIG. 3. The query circuit 1130 includes a query circuit operable to cause a search for a second electronic content based on the indication of expression and on an attribute of the displayed first electronic content. In an alternative embodiment, the query circuit may include a query circuit operable to cause a search of an index for a second electronic content based on the indication of expression and on an attribute of the displayed first electronic content. In an embodiment, the search for a second electronic content may include a search of an index 1154 saved on the digital storage device. In another embodiment, the search for a second electronic content may include a search of at least one of a Web database, Web index, directory index, file index, content of a directory, or content of a file.

The chooser circuit 1140 includes a chooser circuit operable to select the second electronic content from a result of the search for a second electronic content. The digital storage device 1150 includes a storage device operable to save an indication of the selected second electronic content. For example, the indication of the selected second electronic content may be saved in a storage media 1152.

In an alternative embodiment, the electronic device 1104 may include a characterization circuit 1160 operable to determine the attribute of the displayed first electronic content. In another embodiment, the electronic device may include a transmitter circuit 1170 operable to send an indication of the selected second electronic content addressed to the requester. In a further embodiment, the electronic device may include a receiver circuit 1110 operable to receive from a requestor sensor data acquired from a person and indicative of a response by the person to a display of a first electronic content. The receiver circuit may further include a receiver circuit operable to receive from a requestor sensor data acquired from the person and indicative of a response by the person to a display of a first electronic content, and to receive data that is indicative of the displayed first electronic content.

FIG. 19 illustrates an example computer program product. The computer program product includes a computer-readable medium 1210 bearing the program instructions. The computer program product also includes program instructions 1220 operable to perform a process in a computing device. The process includes receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requester an indication of the second content.

In an alternative embodiment, the process further includes select the second content from a result of the search for a second content 1222. In another embodiment, the process further includes save data indicative of the selected second content 1224. In another embodiment, the computer-readable medium includes a computer storage medium.

Figure 21:
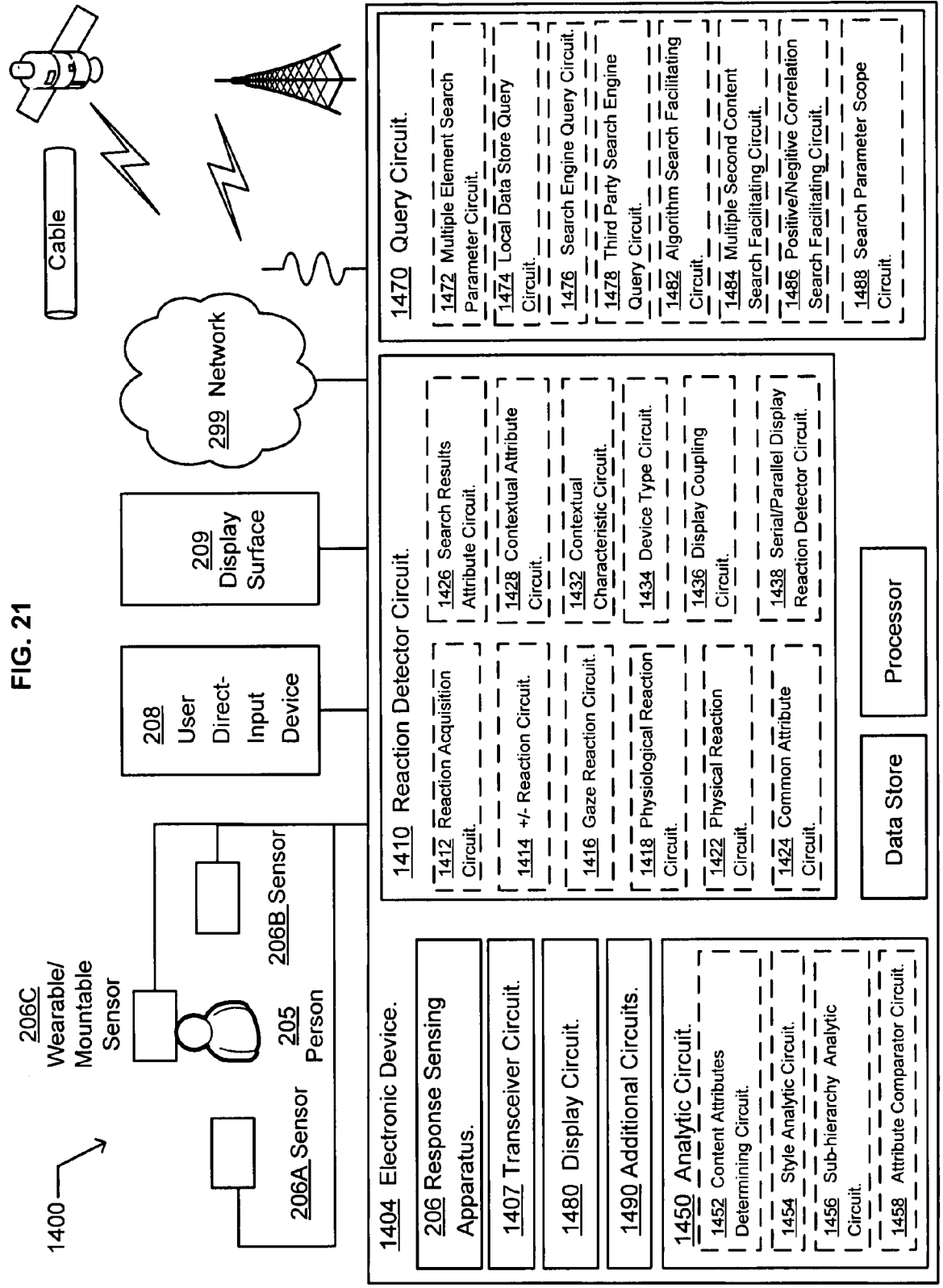
FIG. 21 illustrates an example environment in which embodiments may be implemented.

FIG. 20 illustrates an example system 1300 that includes an electronic device 1305. The electronic device includes means 1310 for receiving data from a requestor indicative of a sensed response by a person to a first content displayed to the person. The electronic device also includes means 1320 for analyzing the received data for an indication of an expression by the person corresponding to the first content. The electronic device further includes means 1330 for facilitating a search for a second content using a search parameter corresponding to the indication of an expression by the person and to a content attribute of the displayed first content. The electronic device also includes means 1340 for returning to the requestor an indication of the second content. In alternative embodiments, the electronic device may include means 1350 for receiving an indication of a content attribute of the displayed first content. The electronic device may include means 1360 for determining a content attribute of the displayed first content FIG. 21 illustrates an example environment 1400 in which embodiments may be implemented. The example environment includes an electronic device 1404, a response sensing apparatus 206, a transceiver circuit 1407, a user direct-input device 208, and a display surface 209. In some embodiments, one or more of the response sensing apparatus, the transceiver circuit, the user direct-input interface, and the display surface may be structurally distinct from the remaining circuits or the electronic device. The display surface may be physically incorporated with the electronic device, or may be physically separate from the electronic device and electronically coupled with the device.

The electronic device 1404 may include a wired or wireless access to digital content using the transceiver 1407, such as via a network 299. In an alternative embodiment, the electronic device may be coupled to the network via a wireless link, a satellite link, and/or a wired link.

In an embodiment, the electronic device 1404 includes a reaction detector circuit 1410, an analytic circuit 1450, a query circuit 1470, and a display circuit 1480. In some embodiments, one or more of the reaction detector circuit, the analytic determining circuit, the query circuit, and/or the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 204 using the user direct-input device 208.

The electronic device 1404 may include at least one additional circuit. The at least one additional circuit may include additional circuits 1490. In addition, the electronic device may include a processor (not illustrated), such as the processing unit 21 described in conjunction with FIG. 1, and/or the processor 120 described in conjunction with FIG. 2. In further addition, the electronic device may include a computer storage media illustrated as a data store. In an embodiment, the electronic device may include a mobile electronic device.

In an embodiment, the reaction detector circuit 1410 may include at least one additional circuit. The at least one additional circuit may include at least one of a reaction acquisition circuit 1412, positive/negative reaction circuit 1414, a gaze reaction circuit 1416, a physiological reaction circuit 1418, a physical reaction circuit 1422, a common attribute circuit 1424, a search results attribute circuit 1426, a contextual attribute circuit 1428, a content characteristic circuit 1432, a device type circuit 1434, a display coupling circuit 1436, and/or a serial/parallel display reaction detector circuit 1438.

In another embodiment, the analytic circuit 1450 may include at least one additional circuit. The at least one additional circuit may include at least one of a content attributes determining circuit 1452, a style analytic circuit 1454, a sub-hierarchy analytic circuit 1458, or an attribute comparator circuit 1458.

In a further embodiment, the query circuit 1470 may include at least one additional circuit. The at least one additional circuit may include at least one of a multiple element search parameter circuit 1472, a local data store query circuit 1474, a search engine query circuit 1476, a third party search engine query circuit 1478, an algorithm search facilitating circuit 1482, a multiple second content search facilitating circuit 1484, a positive/negative correlation search facilitating circuit 1486, or a search parameter scope circuit 1488.

FIG. 22 illustrates an example operational flow 1500 implemented in an environment that includes a person viewing at least two instances of content having a common contextual attribute and displayed by an electronic device. In an alternative embodiment, the environment further includes an environment that includes a person directly interacting with the electronic device using a user direct-input device and viewing at least two instances of content displayed having a common contextual attribute and by an electronic device. FIG. 22 and several following figures may include various examples of operational flows, discussions, and explanations with respect to the above-described environment 1400 of FIG. 21, and/or with respect to other examples and contexts. However, it should be understood that the operational flows may be executed in a number of other environments and contexts, and/or in modified versions of FIG. 21. Also, although the various operational flows are illustrated in a sequence(s), it should be understood that the various operations may be performed in other orders than those which are illustrated, and/or may be performed concurrently.

After a start operation, the operational flow 400 includes an observation operation 1510. The observation operation includes detecting a reaction by a person to a displayed first content of the at least two instances of displayed content having a common contextual attribute. The observation operation may be implemented using the reaction detector circuit 1410 of FIG. 21, and/or the response sensing apparatus 206 of FIG. 3. In an alternative embodiment, the reaction detector circuit 1410 is at least substantially similar to the reaction detector circuit 210 of FIG. 3.

An analytical operation 1550 includes determining a content attribute of the displayed first content. The analytical operation may be implemented using the analytic circuit 1550. A query operation 1570 includes initiating a search for a second content using a search parameter corresponding to the detected reaction and to the determined content attribute. The query operation may be implemented using the query circuit 1470. A broadcast operation 1590 includes facilitating a display of the second content in a manner perceivable by the person. The broadcast operation may be implemented using the display circuit 1480. The operational flow 400 then proceeds to an end operation.

Figure 24:
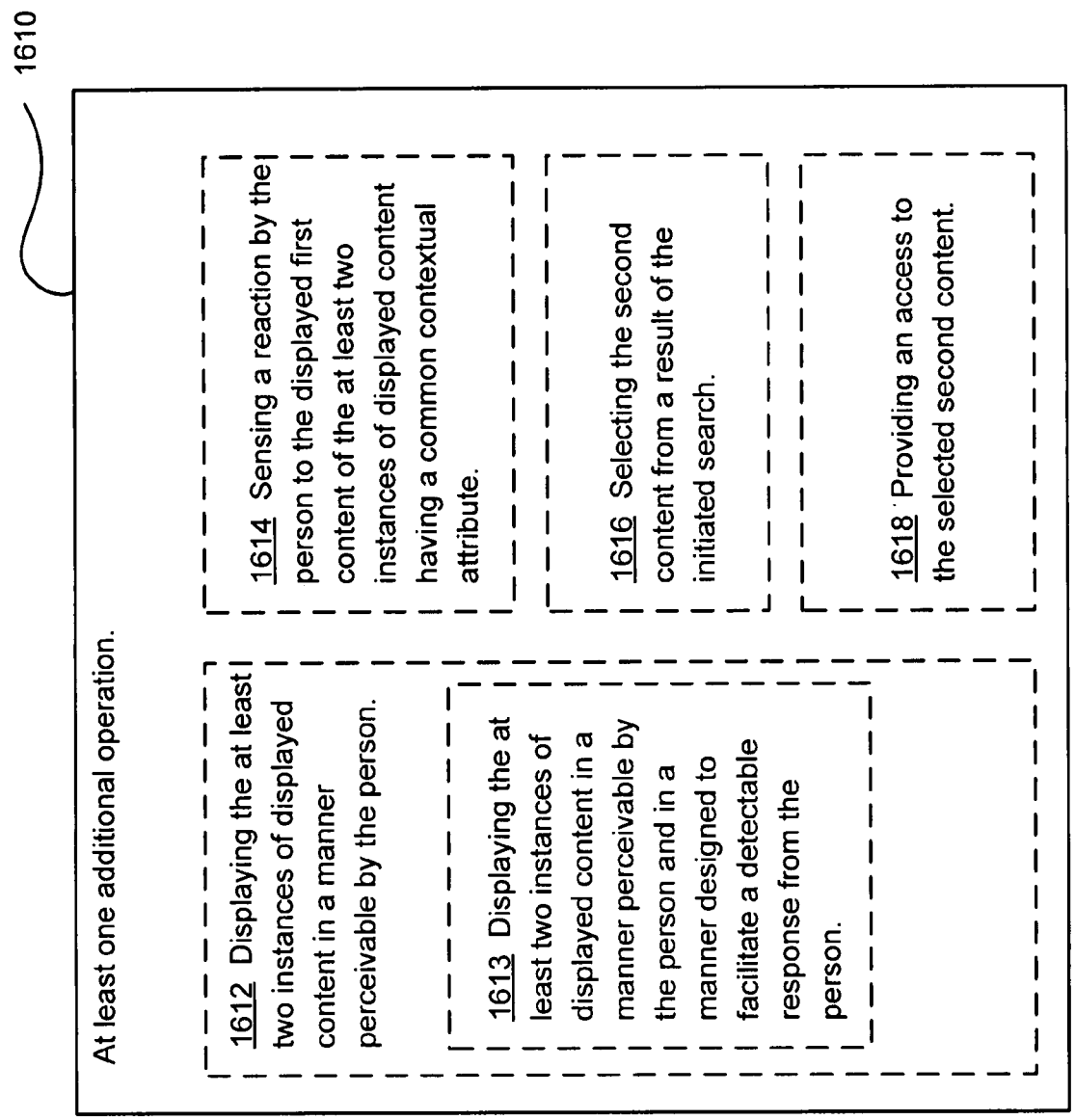

FIGS. 23 and 24 illustrate an alternative embodiment of the operational flow 1400 of FIG. 22. The operational flow may include at least one additional operation, illustrated as an operation 1610. The operation 1610 may include at least one of an operation 1612, an operation 1614, an operation 1616, or an operation 1618. The operation 1612 includes displaying the at least two instances of displayed content in a manner perceivable by the person. In an alternative embodiment, the operation 1612 may include at least one additional embodiment such as the operation 1613. The operation 1613 includes displaying the at least two instances of displayed content in a manner perceivable by the person and in a manner designed to facilitate a detectable response from the person. The operation 1612 and/or operation 1613 may be implemented using the display circuit 1480 and/or the display device 1409 of FIG. 21. The operation 1614 includes sensing a reaction by the person to the displayed first content of the at least two instances of displayed content having a common contextual attribute. The operation 1614 may be implemented using the response sensing apparatus 206 and its associated sensors 206A, 206B, and/or 206C. The operation 1616 includes selecting the second content from a result of the initiated search. The operation 1616 may be implemented using a circuit of the additional circuits 1490. The operation 1618 includes providing an access to the selected second content. The operation 1618 may be implemented using a circuit of the additional circuits 1490.

FIG. 25 illustrates an alternative embodiment of the operational flow 1400 of FIG. 22. The observation operation 1510 may include at least one additional operation. The at least one additional operation may include an operation 1512, an operation 1514, an operation 1516, an operation 1518, an operation 1522, or an operation 1524. The operation 1512 includes at least one of sensing, identifying, or recognizing a reaction by a person to a displayed first content of the at least two instances of displayed content having a common contextual attribute. The operation 1512 may be implemented using the reaction acquisition circuit 1412. The operation 1514 includes detecting at least one of a positive or negative reaction by a person to a displayed first content of the at least two instances of displayed content having a common contextual attribute. The operation 1514 may be implemented using the positive/negative reaction circuit 1414. The operation 1516 includes sensing a gaze by a person at a displayed first content of the at least two instances of displayed content and detecting a reaction by a person to the displayed first content. In an embodiment for example, the person 205 may gaze across a result displayed on the display surface 1409 from a search of the Internet, the displayed result including at least two instances of search results. Each of the at least two instances of displayed search results may be displayed textually on separate lines, or the at least two instances of displayed search results may be representatively and pictorially displayed by figures or pictures. For example, a result of a search of the word "Caesar" may be pictorially displayed by a picture of a statue of the Emperor Caesar, a picture of a Caesar salad, and a picture of Caesar's Italian restaurant. The operation 1516 in this example would include sensing the person's gaze across a first displayed picture of these pictorially represented search results, and detect a reaction by the person to the first picture of the three displayed pictures. For example, the operation 1516 may sense person's gaze on the picture of Caesar's Italian restaurant and detect a reaction. A positive reaction may be detected from the person to the picture of Caesar's Italian restaurant because the person is hungry and looking for a nearby Italian restaurant. The operation 1516 may be implemented using the gaze reaction circuit 1416.

The operation 1518 includes detecting a physiological reaction by a person to a displayed first content of the at least two instances of displayed content having a common contextual attribute. The operation 1518 may be implemented using the physiological reaction circuit 1418. The operation 1522 includes detecting a physiological response by a person to a displayed first content of the at least two instances of displayed content having a common contextual attribute. The operation 1522 may be implemented using the physical reaction circuit 1422. The operation 1524 includes detecting a reaction by a person to a displayed first content of the at least two instances of displayed content having a common contextual attribute. The common contextual attribute including the at least two instances of displayed content having been returned in response to a search request. The operation 1524 may be implemented using the common attribute circuit 1424.

Figure 26:
FIG. 26 illustrates a further alternative embodiment of the operational flow of FIG. 22.

FIG. 26 illustrates a further alternative embodiment of the operational flow 1500 of FIG. 22. The observation operation 1510 may include at least one additional operation. The at least one additional operation may include an operation 1526, an operation 1528, an operation 1532, an operation 1534, an operation 1536, or an operation 1538. The operation 1526 includes detecting a reaction by a person to a displayed first content of the at least two instances of displayed content having a common contextual attribute. The common contextual attribute including being at least one of a displayed search result, an Internet search result, a sports result, a query result, a program list, a music list, a file list, or a directory search result. The operation 1526 may be implemented using the search results attribute circuit 1426. The operation 1528 includes detecting a reaction by a person to a displayed first content of the at least two instances of displayed content having a common contextual attribute. The at least two instances of displayed content including at least one of displayed images, avatars, icons, names, titles, or descriptors. The operation 1528 may be implemented using the contextual attribute detector circuit 1428. The operation 1532 includes detecting a reaction by a person to a displayed first content of the at least two instances of displayed content having a common contextual attribute. The common contextual attribute of at least two instances of displayed content include at least one of a displayed visual-based, image-based, text-based, or sound-based contextual attribute. The operation 1532 may be implemented using the contextual characteristic circuit 1432. The operation 1534 includes detecting a reaction by a person to a displayed first content of the at least two instances of displayed content having a common contextual attribute. The at least two instances of displayed content including content displayed by at least one of a mobile communications device, handheld communications device, desktop computing device, limited resources computing device, thin computing device, or portable computing device. The operation 1534 may be implemented using the device type circuit 1434. The operation 1536 includes detecting a reaction by a person to a displayed first content of the at least two instances of displayed content having a common contextual attribute. The displayed at least two instances of content including at least two instances of content displayed on a surface coupled with a computing device, or displayed on a surface separate from the computing device. The operation 1536 may be implemented using the display coupling circuit 1436. The operation 1538 includes detecting a reaction by a person to a displayed first content of the at least two instances of displayed content. The at least two instances of displayed content includes content displayed in at least one of a consecutive manner, or a simultaneous manner. The operation 1538 may be implemented using the serial/parallel display reaction detector circuit 1438.

Figure 27:
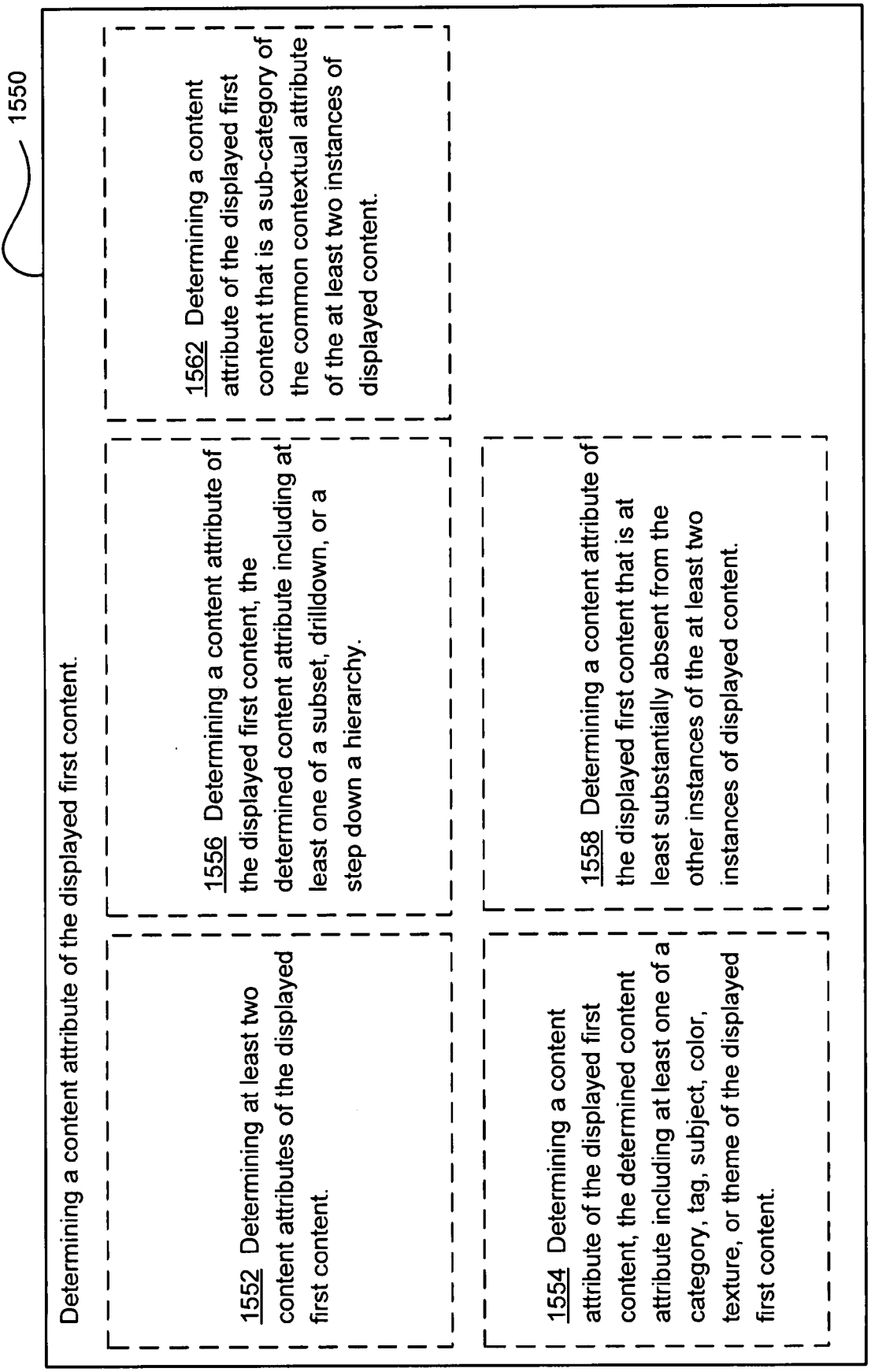
FIG. 27 illustrates an alternative embodiment of the operational flow of FIG. 22.

FIG. 27 illustrates an alternative embodiment of the operational flow 1500 of FIG. 22. The analytical operation 1550 may include at least one additional operation. The at least one additional operation may include an operation 1552, an operation 1554, an operation 1556, an operation 1558, or an operation 1562. The operation 1552 includes determining at least two content attributes of the displayed first content. The operation 1552 may be implemented using the content attributes determining circuit 1452. The operation 1554 includes determining a content attribute of the displayed first content. The determined content attribute including at least one of a category, tag, subject, color, texture, or theme of the displayed first content. For example, a theme may include sunsets, famous athletes, convicts, dogs, cats, horses, cars, airplanes, flowers, people, inventors, or entertainers. The operation 1554 may be implemented using the style analytic circuit 1454. The operation 1556 includes determining a content attribute of the displayed first content, the determined content attribute including at least one of a subset, drilldown, or a step down a hierarchy. The operation 1556 may be implemented using the sub-hierarchy analytic circuit 1456. The operation 1558 includes determining a content attribute of the displayed first content that is at least substantially absent from the other instances of the at least two instances of displayed content. The operation 1562 includes determining a content attribute of the displayed first content that is a sub-category of the common contextual attribute of the at least two instances of displayed content. The operations 1558 and/or 1562 may be implemented using the attribute comparator circuit 1458.

FIG. 28 illustrates another alternative embodiment of the operational flow 1500 of FIG. 22. The query operation 1570 may include at least one additional operation. The at least one additional operation may include an operation 1572, an operation 1574, an operation 1576, an operation 1578, an operation 1582, an operation 1584, an operation 1586, or an operation 1588. The operation 1572 includes initiating a search for a second content using a search parameter corresponding to the detected reaction, to the determined content attribute, and to the common contextual attribute. The operation 1572 may be implemented using the multiple element search parameter circuit 1572. The operation 1574 includes initiating a search of a local data store using a search parameter corresponding to the detected reaction and to the determined content attribute. The operation 1574 may be implemented using the local data store query circuit 1474. The operation 1576 includes initiating a search by a search engine for a second content using a search parameter corresponding to the detected reaction and to the determined content attribute. The operation 1576 may be implemented using the search engine query circuit 1476. The operation 1578 includes initiating a search by a third-party search engine for a second content using a search parameter corresponding to the detected reaction and to the determined content attribute. The operation 1578 may be implemented using the third party search engine query circuit 1478. The operation 1582 includes initiating a search for a second content using a search algorithm responsive to the detected reaction and to the determined content attribute. The operation 1582 may be implemented using the algorithm search facilitating circuit 1482. The operation 1584 includes initiating a search for at least two instances of a second content using a search parameter corresponding to the detected reaction and to the determined content attribute. The operation 1584 may be implemented using the multiple second content search facilitating circuit 1484. The operation 1586 includes initiating a search for a second content based on at least one of a positive correlation, or a negative correlation between the detected reaction and on the determined content attribute. The operation 1586 may be implemented using the positive/negative correlation search facilitating circuit 1486. The operation 1588 includes initiating a search for a second content using a search parameter corresponding to the detected reaction and to a determined content attribute of the at least two instances of displayed content. The operation 1588 may be implemented using the search parameter scope circuit 1488.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
detecting an inaudible physiological reaction by a person to an instance of at least two instances of a displayed first content, the at least two instances of the first content having a common contextual attribute, the detecting being performed while the person is viewing at least one of the at least two instances of the displayed first content;
determining a content attribute of the instance of the at least two instances of the displayed first content that is at least substantially absent from other instances of the at least two instances of the displayed first content;
initiating a search for a second content using a search parameter corresponding to the detected inaudible physiological reaction and to the determined content attribute of the instance;
selecting the second content from a result of the initiated search, the selecting being automated and performed at least in part with a processing device; and
facilitating a display of the selected second content in a manner perceivable by the person.

2. The method of claim 1, further comprising:
displaying the instance of the at least two instances of the displayed first content in a manner perceivable by the person.

3. The method of claim 2, wherein the displaying the instance of the at least two instances of the displayed first content in a manner perceivable by the person further includes:
displaying the instance of the at least two instances of the displayed first content in a manner perceivable by the person and in a manner designed to facilitate a detectable response from the person.

4. The method of claim 1, further comprising:
sensing a reaction by the person to the instance of the at least two instances of the displayed first content, the at least two instances of the displayed first content having a common contextual attribute.

5. The method of claim 1, further comprising:
providing an access to the selected second content.

6. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
at least one of sensing, identifying, or recognizing an inaudible physiological reaction by a person to an instance of at least two instances of a displayed first content, the at least two instances of the first content having a common contextual attribute, the sensing, identifying, or recognizing being performed while the person is viewing at least one of the at least two instances of the displayed first content.

7. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
detecting at least one of a positive or negative inaudible physiological reaction by a person to an instance of at least two instances of a displayed first content, the at least two instances of the first content having a common contextual attribute, the detecting being performed while the person is viewing at least one of the at least two instances of the displayed first content.

8. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
sensing a gaze by a person at a displayed instance of at least two instances of a displayed first content, the at least two instances of the first content having a common contextual attribute, the sensing being performed while the person is viewing at least one of the at least two instances of the displayed first content.

9. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
detecting an inaudible physiological reaction that includes an attention.

10. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
detecting an inaudible physiological reaction by a person to an instance of at least two instances of a displayed first content, the at least two instances of the first content having a common contextual attribute, the detecting being performed while the person is viewing at least one of the at least two instances of the displayed first content, the common contextual attribute including the at least two instances of the displayed first content having been returned in response to a search request.

11. The method of claim 1, wherein the detecting an inaudible physiological reaction by a person to an instance of at least two instances of a displayed first content, the at least two instances of the first content having a common contextual attribute, the detecting being performed while the person is viewing the at least two instances of the displayed first content further includes:
detecting an inaudible physiological reaction by a person to an instance of at least two instances of a displayed first content, the at least two instances of the first content having a common contextual attribute, the detecting being performed while the person is viewing at least one of the at least two instances of the displayed first content, the common contextual attribute including being at least one of a displayed search result, an Internet search result, a sports result, a query result, a program list, a music list, a file list, or a directory search result.

12. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:

the detecting an inaudible physiological reaction by a person to an instance of at least two instances of a displayed first content, the at least two instances of the first content having a common contextual attribute, the detecting being performed while the person is viewing at least one of the at least two instances of the displayed first content, the at least two instances of the displayed first content including at least one of a displayed image, an avatar, an icon, a name, a title, or a descriptor.

13. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
  detecting an inaudible physiological reaction by a person to an instance of at least two instances of a displayed first content, the at least two instances of the first content having a common contextual attribute, the detecting being performed while the person is viewing at least one of the at least two instances of the displayed first content, the common contextual attribute of the at least two instances of the displayed first content including at least one of a visual-based, image-based, text-based, or sound-based contextual attribute.

14. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
  detecting an inaudible physiological reaction by a person to an instance of at least two instances of a displayed first content, the at least two instances of the first content having a common contextual attribute, the detecting being performed while the person is viewing at least one of the at least two instances of the displayed first content, the at least two instances of the displayed first content including content displayed by at least one of a mobile communications device, handheld communications device, desktop computing device, limited resources computing device, thin computing device, or portable computing device.

15. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content further includes:
  detecting an inaudible physiological reaction by a person to an instance of at least two instances of a displayed first content, the at least two instances of the first content having a common contextual attribute, the detecting being performed while the person is viewing at least one of the at least two instances of the displayed first content, the displayed at least two instances of the first content including at least two instances of content displayed on a surface coupled with a computing device, or displayed on a surface separate from the computing device.

16. The method of claim 1, wherein the detecting an inaudible physiological reaction by a person to an instance of at least two instances of a displayed first content further includes:
  detecting a an inaudible physiological reaction by a person to an instance of at least two instances of a displayed first content, the at least two instances of the displayed first content including content displayed in at least one of a consecutive manner, or a simultaneous manner.

17. The method of claim 1, wherein the determining a content attribute of the instance of the at least two instances of the displayed first content that is at least substantially absent from other instances of the at least two instances of the displayed first content further includes:
  determining at least two content attributes of the instance of the at least two instances of the displayed first content that are at least substantially absent from other instances of the at least two instances of the displayed first content.

18. The method of claim 1, wherein the determining a content attribute of the instance of the at least two instances of the displayed first content that is at least substantially absent from other instances of the at least two instances of the displayed first content further includes:
  determining a content attribute of the instance of the at least two instances of the displayed first content that is at least substantially absent from other instances of the at least two instances of the displayed first content, the determined content attribute including at least one of a category, tag, subject, color, texture, or theme of the displayed first content.

19. The method of claim 1, wherein determining a content attribute of the instance of the at least two instances of the displayed first content that is at least substantially absent from other instances of the at least two instances of the displayed first content further includes:
  determining a content attribute of the instance of the at least two instances of the displayed first content that is at least substantially absent from other instances of the at least two instances of the displayed first content, the determined content attribute including at least one of a subset, drilldown, or a step down hierarchy.

20. The method of claim 1, wherein the determining a content attribute of the instance of the at least two instances of the displayed first content that is at least substantially absent from other instances of the at least two instances of the displayed first content further includes:
  determining a content attribute of the instance of the at least two instances of the displayed first content that is at least substantially absent from other instances of the at least two instances of the displayed first content that is a sub-category of the common contextual attribute of the at least two instances of the displayed first content.

21. The method of claim 1, wherein the initiating a search for a second content using a search parameter corresponding to the detected inaudible physiological reaction and to the determined content attribute of the instance further includes:
  initiating a search, with a processing device, for a second content using a search parameter corresponding to the detected inaudible physiological reaction, to the determined content attribute of the instance, and to the common contextual attribute, wherein the search with the processing device for second content includes a search of at least an index or a file directory.

22. The method of claim 1, wherein the initiating a search for a second content using a search parameter corresponding to the detected inaudible physiological reaction and to the determined content attribute of the instance further includes:
  initiating a search, with a processing device, of a local data store for a file using a search parameter corresponding to the detected inaudible physiological reaction and to the determined content attribute of the instance.

23. The method of claim 1, wherein the initiating a search for a second content using a search parameter corresponding to the detected inaudible physiological reaction and to the determined content attribute of the instance further includes:
　　initiating a search, with a processing device, by a search engine for a second content using a search parameter corresponding to the detected inaudible physiological reaction and to the determined content attribute of the instance.

24. The method of 1, wherein the initiating a search for a second content using a search parameter corresponding to the detected inaudible physiological reaction and to the determined content attribute of the instance further includes:
　　initiating an Internet search by a publicly-available third-party Internet search engine for a second content using a search parameter corresponding to the detected inaudible physiological reaction and to the determined content attribute of the instance.

25. The method of claim 1, initiating a search for a second content using a search parameter corresponding to the detected inaudible physiological reaction and to the determined content attribute of the instance further includes:
　　initiating a search for a second content using a search algorithm responsive to the detected inaudible physiological reaction and to the determined content attribute of the instance.

26. The method of claim 1, wherein the initiating a search for a second content using a search parameter corresponding to the detected inaudible physiological reaction and to the determined content attribute of the instance further includes:
　　initiating a search for at least two instances of a second content using a search parameter corresponding to the detected inaudible physiological reaction and to the determined content attribute of the instance.

27. The method of claim 1, wherein the initiating a search for a second content using a search parameter corresponding to the detected inaudible physiological reaction and to the determined content attribute of the instance further includes:
　　initiating a search for a second content based on at least one of a positive correlation, or a negative correlation between the detected inaudible physiological reaction and the determined content attribute of the instance.

28. The method of claim 1, wherein the initiating a search for a second content using a search parameter corresponding to the detected inaudible physiological reaction and to the determined content attribute of the instance further includes:
　　initiating a search for a second content using a search parameter corresponding to the detected inaudible physiological reaction and to a determined content attribute of the instance of the at least two instances of the displayed first content.

29. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
　　detecting an inaudible physiological reaction that includes at least one of a gaze, a gaze dwell time, an eye movement, a facial movement, or a pupil dilation.

30. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
　　detecting an inaudible physiological reaction that includes a stance.

31. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
　　detecting an inaudible physiological reaction that includes at least one of a change in breathing rate or a change in heart rate.

32. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
　　detecting an inaudible physiological reaction that includes at least one of a brain wave, a brain wave pattern, or a P-300 response.

33. The method of claim 1, wherein the detecting an inaudible physiological reaction by a person to an instance of at least two instances of a displayed first content, the at least two instances of the first content having a common contextual attribute, the detecting being performed while the person is viewing at least one of the at least two instances of the displayed first content includes:
　　detecting an inaudible physiological reaction by a person to an instance of at least two instances of a displayed first content, the at least two instances of the first content having a common contextual attribute, the detecting being performed while the person is viewing at least one of the at least two instances of the displayed first content, wherein the displayed first content includes displayed search results from a search with a third-party Internet search engine.

34. A method comprising:
　　detecting an inaudible physiological reaction by a person to an instance of at least two instances of a displayed first content, the at least two instances of the first content having a common contextual attribute, the detecting being performed while the person is viewing one or more of the at least two instances of the displayed first content;
　　determining a content attribute of the instance of the at least two instances of the displayed first content that is at least substantially absent from other instances of the at least two instances of the displayed first content;
　　initiating a search for a second content using a search parameter corresponding to the detected inaudible physiological reaction and to the determined content attribute of the instance;
　　selecting the second content from a result of the initiated search, the selecting being automated and performed at least in part with a processing device; and
　　facilitating a display of the selected second content in a manner perceivable by the person.

35. The method of claim 34, wherein the detected inaudible physiological reaction includes at least an attention.

36. The method of claim 34, wherein the detected inaudible physiological reaction includes at least one of a gaze, an eye movement, a facial movement, a gaze dwell time, or a pupil dilation.

37. The method of claim 34, wherein the detected inaudible physiological reaction includes a stance.

38. The method of claim 37, further comprising detecting the stance with a wearable sensor.

39. The method of claim 34, wherein the detected inaudible physiological reaction includes at least one of a change in breathing rate or a change in heart rate.

40. The method of claim 34, wherein the detected inaudible physiological reaction includes at least one of a brain wave, a brain wave pattern, or a P-300 response.

41. A method comprising:
  detecting an inaudible physiological reaction to a displayed first content from among a plurality of displayed contents by a person viewing the plurality of displayed contents;
  determining an attribute of the displayed first content that is perceptibly different from other displayed content of the plurality of displayed contents;
  initiating a search for a second content based on a search parameter that corresponds to the detected inaudible physiological reaction and to the determined attribute;
  selecting the second content from a result of the initiated search, the selecting being automated and performed at least in part with a processing device; and
  facilitating a display of the selected second content in a manner perceivable by the person.

42. The method of claim 41, wherein the detected inaudible physiological reaction includes an attention.

43. The method of claim 41, wherein the detected inaudible physiological reaction includes at least one of a gaze, an eye movement, a facial movement, a gaze dwell time, or a pupil dilation.

44. The method of claim 41, wherein the detected inaudible physiological reaction includes a stance.

45. The method of claim 44, further comprising detecting the stance with a wearable sensor.

46. The method of claim 41, wherein the detected inaudible physiological reaction includes at least one of a change in breathing rate or a change in heart rate.

47. The method of claim 41, wherein the detected inaudible physiological reaction includes at least one of a brain wave, a brain wave pattern, or a P-300 response.

* * * * *